(12) United States Patent
Fakoorian et al.

(10) Patent No.: US 11,871,410 B2
(45) Date of Patent: Jan. 9, 2024

(54) JOINT SHARED CHANNEL TIMING ALLOCATION IN DOWNLINK CONTROL INFORMATION

(71) Applicant: QUALCOMM Incorporated, San Diego, CA (US)

(72) Inventors: Seyed Ali Akbar Fakoorian, San Diego, CA (US); Wei Yang, San Diego, CA (US); Muhammad Sayed Khairy Abdelghaffar, San Jose, CA (US); Hwan Joon Kwon, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 175 days.

(21) Appl. No.: 17/233,255

(22) Filed: Apr. 16, 2021

(65) Prior Publication Data

US 2021/0360664 A1 Nov. 18, 2021

Related U.S. Application Data

(60) Provisional application No. 63/023,818, filed on May 12, 2020.

(51) Int. Cl.
*H04W 72/1273* (2023.01)
*H04W 72/1268* (2023.01)
(Continued)

(52) U.S. Cl.
CPC ....... *H04W 72/1273* (2013.01); *H04L 1/0004* (2013.01); *H04W 56/0045* (2013.01);
(Continued)

(58) Field of Classification Search
CPC ......... H04W 72/1273; H04W 56/0045; H04W 72/042; H04W 72/0446; H04W 72/1257;
(Continued)

(56) References Cited

U.S. PATENT DOCUMENTS

2015/0109969 A1* 4/2015 Celebi ................... H04L 5/0073
370/278
2016/0037492 A1 2/2016 Xu et al.
(Continued)

FOREIGN PATENT DOCUMENTS

CN 110120861 A * 8/2019 ........... H04L 5/0053
WO WO-2018045576 A1 * 3/2018 ............ H04W 48/16
(Continued)

OTHER PUBLICATIONS

Lu et al., "PUCCH Resource Determination Method and Receiving Method Thereof, Terminal Apparatus, and Network Side Apparatus", Jul. 18, 2019, WO, English translation of WO 2019137277. (Year: 2019).*

(Continued)

*Primary Examiner* — Michael K Phillips
(74) *Attorney, Agent, or Firm* — Holland & Hart LLP

(57) ABSTRACT

Methods, systems, and devices for wireless communications are described that support joint allocation for both an uplink message and a downlink message. In some cases, joint downlink control information (DCI) may indicate a time domain resource allocation (TDRA) for a downlink data channel and an uplink data channel. For example, bits of the joint DCI may be configured to indicate TDRA parameters of a downlink data channel (e.g., starting symbol, length value, slot offset, mapping type, timing advance, number of repetitions) and based on the TDRA parameters of the downlink data channel, TDRA parameters for an uplink data channel may be determined by a user equipment (UE) using the joint DCI.

46 Claims, 18 Drawing Sheets

(51) Int. Cl.
*H04W 56/00* (2009.01)
*H04W 80/02* (2009.01)
*H04L 1/00* (2006.01)
*H04W 72/0446* (2023.01)
*H04W 72/23* (2023.01)
*H04W 72/50* (2023.01)

(52) U.S. Cl.
CPC ... *H04W 72/0446* (2013.01); *H04W 72/1268* (2013.01); *H04W 72/23* (2023.01); *H04W 72/535* (2023.01); *H04W 80/02* (2013.01)

(58) Field of Classification Search
CPC ............. H04W 72/1268; H04W 80/02; H04W 72/1289; H04W 72/23; H04W 72/535; H04L 1/0004
See application file for complete search history.

(56) References Cited

U.S. PATENT DOCUMENTS

| | | | | |
|---|---|---|---|---|
| 2016/0150532 | A1* | 5/2016 | Bhushan | H04W 72/0446 370/336 |
| 2016/0192331 | A1 | 6/2016 | Liang et al. | |
| 2016/0330011 | A1* | 11/2016 | Lee | H04W 52/10 |
| 2017/0332397 | A1* | 11/2017 | Li | H04L 1/1887 |
| 2018/0368169 | A1* | 12/2018 | Jung | H04W 72/0413 |
| 2019/0349980 | A1* | 11/2019 | Li | H04W 72/1273 |
| 2020/0213981 | A1* | 7/2020 | Park | H04L 1/1864 |
| 2020/0221317 | A1* | 7/2020 | You | H04W 4/70 |
| 2020/0229206 | A1* | 7/2020 | Badic | H04W 52/0209 |
| 2020/0236661 | A1* | 7/2020 | Hassan Hussein | H04W 72/21 |
| 2020/0305133 | A1 | 9/2020 | Zhou et al. | |
| 2020/0305183 | A1* | 9/2020 | Papasakellariou | H04W 52/243 |
| 2020/0329437 | A1* | 10/2020 | MolavianJazi | H04W 52/346 |
| 2021/0013991 | A1* | 1/2021 | Park | H04L 1/0003 |
| 2021/0067276 | A1* | 3/2021 | Wang | H04L 1/1854 |
| 2021/0218539 | A1* | 7/2021 | Hu | H04L 1/1861 |
| 2021/0234643 | A1* | 7/2021 | Wang | H04L 1/1822 |
| 2021/0259004 | A1* | 8/2021 | Takeda | H04W 72/1289 |
| 2022/0015122 | A1* | 1/2022 | Chai | H04L 5/0037 |
| 2022/0167193 | A1* | 5/2022 | Kim | H04L 5/0094 |
| 2022/0182160 | A1* | 6/2022 | Su | H04L 27/2691 |
| 2022/0312483 | A1* | 9/2022 | Bae | H04L 1/189 |
| 2022/0338226 | A1* | 10/2022 | Nemeth | H04L 5/0051 |
| 2022/0353698 | A1* | 11/2022 | Jang | H04L 1/189 |
| 2023/0105294 | A1* | 4/2023 | Park | H04W 72/569 370/329 |

FOREIGN PATENT DOCUMENTS

| | | | | |
|---|---|---|---|---|
| WO | WO-2019137277 | A1 * | 7/2019 | H04L 1/18 |
| WO | WO-2020057421 | A1 * | 3/2020 | H04W 72/0446 |
| WO | WO-2021221477 | A1 * | 11/2021 | |

OTHER PUBLICATIONS

Bae et al., "Method and Apparatus for Instructions Regarding Time and Frequency Offset in Communication System", Nov. 4, 2021, WO, English translation of WO 2021221477. (Year: 2021).*

Wang et al., "Obtaining and Indication Method, Terminal, Base Station, Medium and System for Transmitting Position", Aug. 13, 2019 CN, English translation of CN 110120861. (Year: 2019).*

Chen et al, "Communication Method, User Equipment and Network Device Thereof", Mar. 15, 2018, WO, English translation of WO 2018045576. (Year: 2018).*

Huang et al., "Resource scheduling method and apparatus", Mar. 26, 2020, WO, WO-2020057421 English translation. (Year: 2020).*

Huang et al., "Resource Scheduling Method and Apparatus" Mar. 26, 2020, WO, English translation of WO 2020057421. (Year: 2020).*

International Search Report and Written Opinion—PCT/US2021/027982—ISAEPO—dated Aug. 3, 2021.

3GPP TS 38.214: "3rd Generation Partnership Project, Technical Specification Group Radio Access Network, NR, Physical Layer Procedures for Data (Release 15)", 3GPP Standard, Technical Specification, 3GPP, Mobile Competence Centre, 650, Route Des Lucioles, F-06921 Sophia-Antipolis Cedex, France, vol. RAN WG1, No. V15.2.0 (Jun. 2018), Jun. 29, 2018, XP051474491, pp. 1-95, Jun. 1, 2018.

* cited by examiner

JOINT SHARED CHANNEL TIMING ALLOCATION IN DOWNLINK CONTROL INFORMATION

CROSS REFERENCE

The present Application for Patent claims the benefit of U.S. Provisional Patent Application No. 63/023,818 by FAKOORIAN et al., entitled "JOINT SHARED CHANNEL TIMING ALLOCATION IN DOWNLINK CONTROL INFORMATION," filed May 12, 2020, assigned to the assignee hereof, and expressly incorporated by reference herein.

FIELD OF TECHNOLOGY

The following relates generally to wireless communications and more specifically to joint shared channel allocation in downlink control information (DCI).

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some wireless communications systems may support communications between a base station and a UE operating on a portion of a radio frequency spectrum band, which may be referred to as a bandwidth part (BWP). A base station may use downlink control information (DCI) over a BWP to schedule one or more resources for a UE. DCI may schedule resources via a downlink channel (e.g., a physical downlink control channel (PDCCH)). DCI, however, may be used to schedule uplink and downlink messages in separate PDCCH messages, which may lead to increased signaling overhead and decoding complexity at the UE when both uplink and downlink messages are scheduled for the UE.

SUMMARY

The present disclosure relates to methods, systems, devices, and apparatuses that support joint downlink control information (DCI) allocation for both an uplink message and a downlink message in an unpaired radio frequency spectrum band. In some cases, a carrier bandwidth may be divided into multiple bandwidth parts (BWPs), and communications between a user equipment (UE) and a base station may use one or more subbands within a BWP. In some cases, a UE may implement a subband full-duplex (SBFD) configuration. The SBFD configuration may allow for one or more BWPs to be used for an associated downlink or uplink transmission and may provide capability for receiving downlink information and transmitting uplink information in overlapping time resources within a carrier bandwidth.

Various aspects of the disclosure provide for a UE with SBFD capability to determine time frequency resources from a joint DCI message. In some aspects, DCI may indicate time domain resource allocation (TDRA) for a downlink data channel (e.g., a physical downlink shared channel (PDSCH)). Additionally, DCI may indicate TDRA for an uplink data channel (e.g., a physical uplink shared channel (PUSCH)). Some bits of DCI may be configured to indicate TDRA channel characteristics of each data channel (e.g., starting symbol, length value, slot offset, mapping type, timing advance, number of repetitions). In some examples, some bits of DCI may indicate scheduling information allocating first resources of a downlink message and second resources for an uplink message that at least partially overlap the first resources in time, frequency, or both. In some cases, allocation of downlink and uplink resources in some bits of DCI may be transmitted through a control message (e.g., a joint control message), which may result in less signaling overhead and decoding complexity at the UE as compared to scheduling downlink and uplink allocation messages in separate control messages.

A method for wireless communications at a UE is described. The method may include receiving, from a base station, a control message that includes scheduling information for a downlink message to be received by the UE and an uplink message to be transmitted by the UE, the scheduling information allocating first resources for the downlink message and second resources for the uplink message, receiving the downlink message using the first resources according to timing information for the downlink message that is determined based on the scheduling information, and transmitting the uplink message using the second resources according to timing information for the uplink message that is determined based on the timing information for the downlink message and the scheduling information.

An apparatus for wireless communications at a UE is described. The apparatus may include a processor, memory coupled with the processor, and instructions stored in the memory. The instructions may be executable by the processor to cause the apparatus to receive, from a base station, a control message that includes scheduling information for a downlink message to be received by the UE and an uplink message to be transmitted by the UE, the scheduling information allocating first resources for the downlink message and second resources for the uplink message, receive the downlink message using the first resources according to timing information for the downlink message that is determined based on the scheduling information, and transmit the uplink message using the second resources according to timing information for the uplink message that is determined based on the timing information for the downlink message and the scheduling information.

Another apparatus for wireless communications at a UE is described. The apparatus may include means for receiving, from a base station, a control message that includes scheduling information for a downlink message to be received by the UE and an uplink message to be transmitted by the UE, the scheduling information allocating first resources for the downlink message and second resources for the uplink message, means for receiving the downlink message using the first resources according to timing information for the downlink message that is determined based on the scheduling information, and means for transmitting the uplink message using the second resources according to timing information for the uplink message that is determined based on the timing information for the downlink message and the scheduling information.

A non-transitory computer-readable medium storing code for wireless communications at a UE is described. The code may include instructions executable by a processor to receive, from a base station, a control message that includes scheduling information for a downlink message to be received by the UE and an uplink message to be transmitted by the UE, the scheduling information allocating first resources for the downlink message and second resources for the uplink message, receive the downlink message using the first resources according to timing information for the downlink message that is determined based on the scheduling information, and transmit the uplink message using the second resources according to timing information for the uplink message that is determined based on the timing information for the downlink message and the scheduling information.

Some examples of the method, apparatuses, and non-transitory computer-readable medium described herein may further include operations, features, means, or instructions for determining a starting symbol, a length value, a slot offset, a mapping type, or any combination thereof for the downlink message based on a TDRA field of the control message.

Some examples of the method, apparatuses, and non-transitory computer-readable medium described herein may further include operations, features, means, or instructions for receiving a message from the base station indicating a delta symbol value associated with the timing information for the uplink message, where the message may be received via radio resource control (RRC) signaling, a medium access control (MAC) control element (MAC-CE), or DCI.

Some examples of the method, apparatuses, and non-transitory computer-readable medium described herein may further include operations, features, means, or instructions for determining a starting symbol for the uplink message based on a starting symbol of the downlink message and the delta symbol value.

Some examples of the method, apparatuses, and non-transitory computer-readable medium described herein may further include operations, features, means, or instructions for determining a starting symbol for the uplink message based on the delta symbol value and a symbol during a monitoring occasion in which the control message may be received.

In some examples of the method, apparatuses, and non-transitory computer-readable medium described herein, the message includes a set of delta symbol values and the method, apparatuses, and non-transitory computer-readable medium may include further operations, features, means, or instructions for selecting the delta symbol value from the set of delta symbol values based on the scheduling information.

Some examples of the method, apparatuses, and non-transitory computer-readable medium described herein may further include operations, features, means, or instructions for receiving a message from the base station indicating a delta slot value associated with the timing information for the uplink message, where the message may be received via RRC signaling, a MAC-CE, or DCI.

Some examples of the method, apparatuses, and non-transitory computer-readable medium described herein may further include operations, features, means, or instructions for determining a slot for transmission of the uplink message based on a starting symbol for the downlink message, the delta slot value, and a ratio that may be based on a first subcarrier spacing for the uplink message and a second subcarrier spacing for the downlink message.

Some examples of the method, apparatuses, and non-transitory computer-readable medium described herein may further include operations, features, means, or instructions for determining a slot for transmission of the uplink message based on a slot scheduled for the downlink message and the delta slot value.

Some examples of the method, apparatuses, and non-transitory computer-readable medium described herein may further include operations, features, means, or instructions for determining a set of time resources for transmission of the uplink message based on the timing information for the downlink message, applying a timing advance of the UE for transmitting the uplink message based on the set of time resources, and transmitting the uplink message in accordance with the set of time resources and the applied timing advance.

Some examples of the method, apparatuses, and non-transitory computer-readable medium described herein may further include operations, features, means, or instructions for determining a set of time resources for transmission of the uplink message that may be aligned with a set of downlink symbols based on the timing information for the downlink message or the timing information for the uplink message and transmitting the uplink message via the set of time resources.

Some examples of the method, apparatuses, and non-transitory computer-readable medium described herein may further include operations, features, means, or instructions for determining a symbol length for transmission of the uplink message based on a start symbol of the uplink message.

Some examples of the method, apparatuses, and non-transitory computer-readable medium described herein may further include operations, features, means, or instructions for receiving a message from the base station including a length indicator for transmission of the uplink message, where the message may be received via RRC signaling, a MAC-CE, or DCI, determining a symbol length for the uplink message based on the length indicator, and transmitting the uplink message in accordance with the determined symbol length.

In some examples of the method, apparatuses, and non-transitory computer-readable medium described herein, determining the symbol length for the uplink message may include operations, features, means, or instructions for selecting the symbol length from the set of symbol lengths based on the scheduling information.

Some examples of the method, apparatuses, and non-transitory computer-readable medium described herein may further include operations, features, means, or instructions for determining a reference signal mapping type for the uplink message based on a portion of the scheduling information of the control message.

Some examples of the method, apparatuses, and non-transitory computer-readable medium described herein may further include operations, features, means, or instructions for determining that the reference signal mapping type may be Type-A mapping based on a starting symbol and a symbol length of the uplink message.

Some examples of the method, apparatuses, and non-transitory computer-readable medium described herein may further include operations, features, means, or instructions for determining a repetition index based on the scheduling information and determining a number of repetitions for the uplink message based on the repetition index.

Some examples of the method, apparatuses, and non-transitory computer-readable medium described herein may further include operations, features, means, or instructions for determining a number of repetitions for the downlink message based on the scheduling information and determining the number of repetitions for the uplink message based on the number of repetitions of the downlink message.

Some examples of the method, apparatuses, and non-transitory computer-readable medium described herein may further include operations, features, means, or instructions for determining the number of repetitions for the uplink message based on the number of repetitions for the downlink message and a delta value.

Some examples of the method, apparatuses, and non-transitory computer-readable medium described herein may further include operations, features, means, or instructions for receiving a message from the base station including the repetition index, where the message may be received via RRC signaling.

Some examples of the method, apparatuses, and non-transitory computer-readable medium described herein may further include operations, features, means, or instructions for communicating the uplink and downlink messages with the base station via a same carrier based on the scheduling information.

Some examples of the method, apparatuses, and non-transitory computer-readable medium described herein may further include operations, features, means, or instructions for receiving the control message via a carrier different from the same carrier used for the uplink and downlink messages.

Some examples of the method, apparatuses, and non-transitory computer-readable medium described herein may further include operations, features, means, or instructions for determining a first modulation and coding scheme (MCS) for the downlink message based on the control message and determining a second MCS for the uplink message based on the first MCS for the downlink message.

In some examples of the method, apparatuses, and non-transitory computer-readable medium described herein, the first resources at least partially overlap the second resources in at least one of time or frequency.

DETAILED DESCRIPTION

Figure 1:
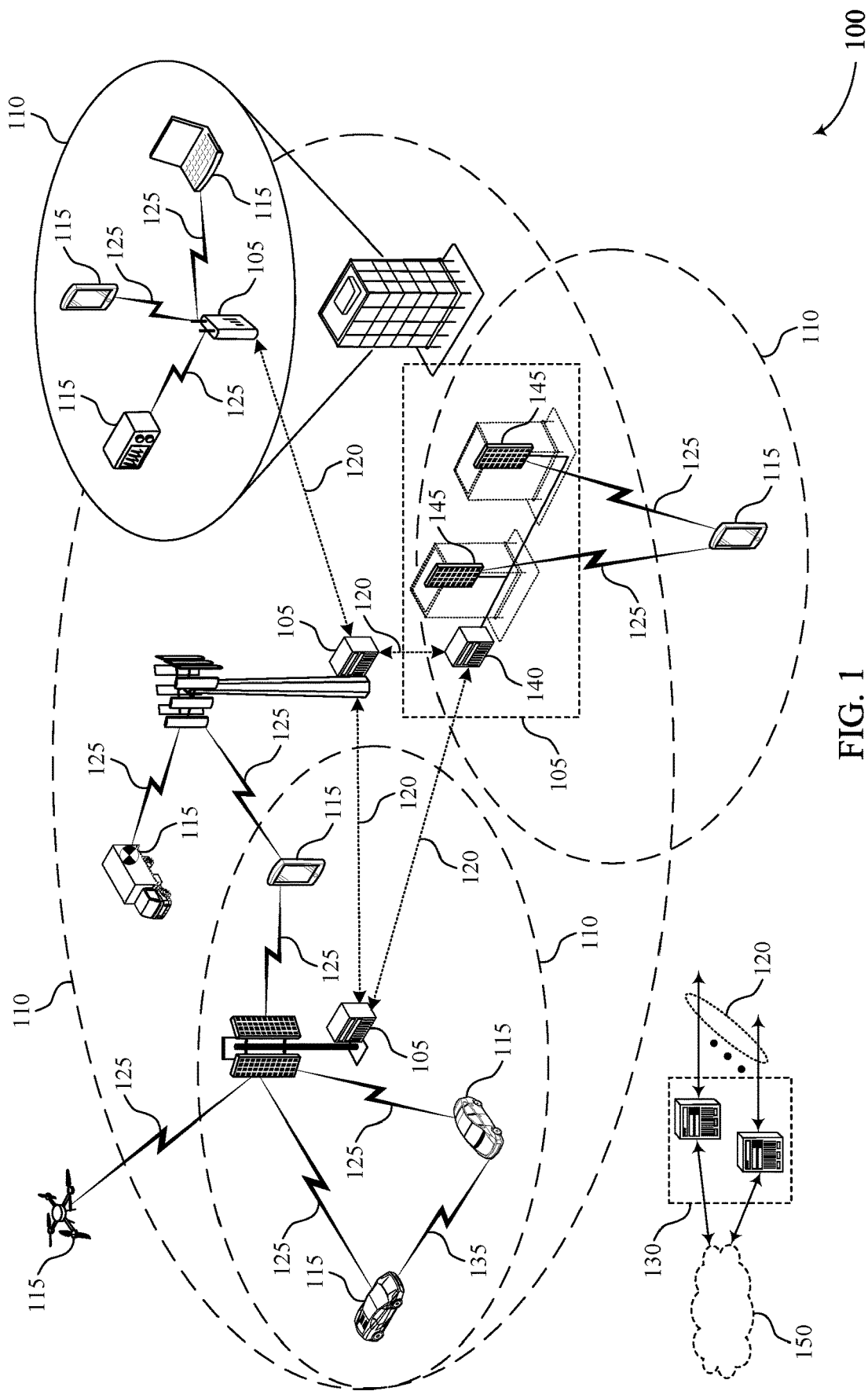
FIG. 1 illustrates an example of a for wireless communications system that supports joint shared channel allocation in downlink control information (DCI) in accordance with aspects of the present disclosure.

In some wireless communications systems, a user equipment (UE) and a base station may communicate using an unpaired radio frequency spectrum band, which may be split into one or more bandwidth parts (BWPs). Each BWP may include one or more subbands (e.g., sub-channels, or other form of frequency resource sets). In some cases, a base station may transmit downlink control information (DCI) over a BWP to schedule one or more resources for the UE. In some aspects, DCI may schedule resources via a downlink control channel (e.g., a physical downlink control channel (PDCCH)). The UE may use DCI to dynamically allocate resources through separate PDCCH messages. For example, a PDCCH message configured for downlink allocation may transmit an indication of downlink resources to the UE, and a PDCCH message configured for uplink allocation may only transmit an indication of uplink resources to the UE. However, allocating resources with separate PDCCH message over a BWP may lead to increased signaling overhead and decoding complexity at the UE when both uplink and downlink messages are scheduled for the UE.

Techniques are described herein for joint DCI allocation for both an uplink message and a downlink message in an unpaired radio frequency spectrum band. In some examples, the UE may receive DCI indicating at least one uplink BWP, or downlink BWP, or both. In some cases, a base station may transmit to a UE implementing a subband full-duplex (SBFD) configuration, which may allow the UE to communicate downlink and uplink information on one or more subbands of a BWP. Additionally, the SBFD capability of the UE may allow the UE to receive a downlink message and transmit an uplink message in overlapping time resources between and within BWPs (e.g., such that the downlink and uplink messages partially or fully overlap in time). In some cases, the UE with SBFD capability may determine time frequency resources from a joint DCI message. The joint DCI message may indicate a time domain resource allocation (TDRA) for a downlink data channel (e.g., a physical downlink shared channel (PDSCH)). Using the TDRA for the downlink channel, the UE may determine a resource allocation for an uplink data channel (e.g., a physical uplink shared channel (PUSCH)). Some bits of DCI may indicate scheduling information allocating first resources of a downlink message and second resources for an uplink message. The second resources may at least partially overlap the first resources in time, frequency, or both. In some cases, allocation of downlink and uplink resources in some bits of DCI may be transmitted through a joint control message and may result in less signaling overhead and decoding complexity at the UE than separate scheduling downlink and uplink allocation.

In some aspects, DCI may indicate TDRA channel characteristics of each data channel for a message. For example, DCI may allocate TDRA for PDSCH by configuring a first number of the most significant bits (MSB) or least significant bits (LSB) of a TDRA bit field in the DCI. The MSB of the TDRA field may indicate multiple characteristics of the PDSCH (e.g., starting symbol, transmission allocation length, transmission slot, mapping type). Additionally, DCI may indicate multiple characteristics of the PUSCH (e.g., starting symbol, transmission allocation length, transmission slot, mapping type, number of transmission repetitions). In some cases, a TDRA channel characteristic may configured through higher layer signaling or dynamically indicated from a configured set. For example, a base station may transmit a control message indicating a delta symbol value associated with the timing information for the uplink message. The delta symbol value may be used to determine a starting symbol of an uplink message. In some examples, a base station may transmit a control message indicating a delta slot value associated with the timing information for the uplink message. The delta slot value may help determine a slot for transmission of the uplink message. In some examples, a base station may transmit a length indicator which may determine a symbol length for the uplink message.

In some cases, TDRA allocations may also enable a timing advance. In some examples, the TDRA channel characteristics of the PDSCH may help determine the TDRA channel characteristics of the PUSCH. For instance, the starting symbol value of a downlink message may be used to obtain the starting symbol of an uplink message.

Aspects of the disclosure are initially described in the context of wireless communications systems. Aspects are then described with respect to time-frequency plots and a process flow. Aspects of the disclosure are further illustrated by and described with reference to apparatus diagrams, system diagrams, and flowcharts that relate to joint shared channel allocation in DCI.

FIG. 1 illustrates an example of a wireless communications system 100 that supports joint shared channel allocation in DCI in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a BWP) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a subband, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing (Δf) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords).

Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more subbands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A base station 105 may transmit joint DCI to a UE 115 that indicates resource allocation information for both an uplink message to be transmitted by the UE 115 and a downlink message to be received by the UE 115. In some cases, the joint DCI may include time or frequency allocation information, such as a TDRA field or a frequency domain resource allocation (FDRA) field, that indicates time frequency resources allocated for downlink and uplink messages for the UE 115. For example, the base station 105 may transmit a joint DCI that includes a TDRA field indicating timing information (e.g., start symbol, transmission length) for a downlink message to be received by the UE 115. Based on the timing information for the downlink message, the UE 115 may determine timing information (e.g., start symbol, transmission length, slot index) for the uplink message.

Figure 2:
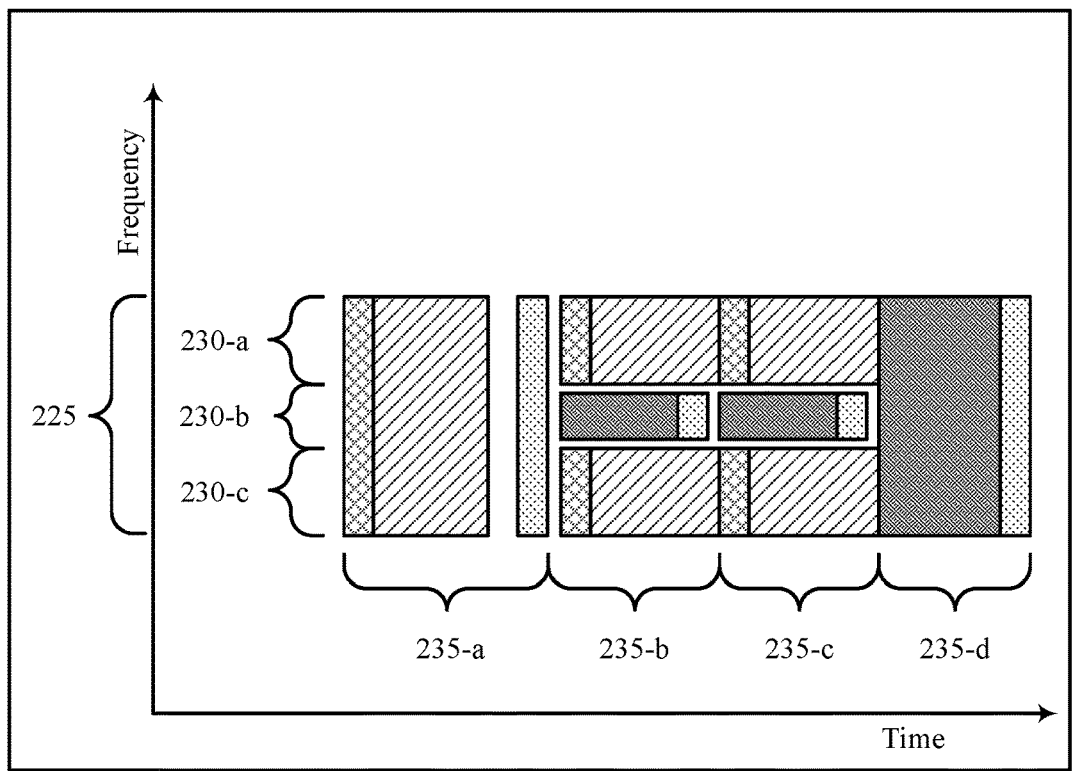
FIG. 2 illustrates an example of a wireless communications system that supports joint shared channel allocation in DCI in accordance with aspects of the present disclosure.
Figure 2:
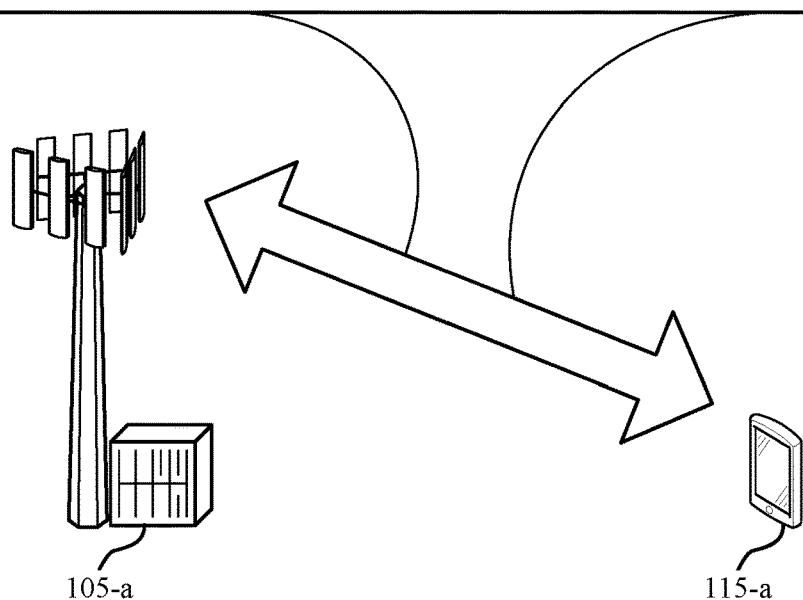
Figure 2:
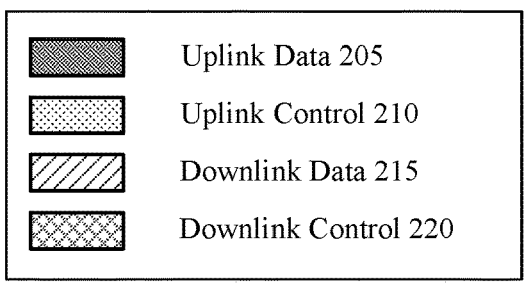

FIG. 2 illustrates an example of a wireless communications system 200 that supports joint shared channel allocation in DCI in accordance with aspects of the present disclosure. In some examples, the wireless communications system 200 may implement aspects of the wireless communications system 100. For example, wireless communications system 200 may include UE 115-a and base station 105-a, which may be examples of UEs 115 and base stations 105 as described with reference to FIG. 1.

In some examples, UE 115-a may communicate with base station 105-a using time-frequency resources, such as a bandwidth 225. Bandwidth 225 may be used for transmitting or receiving data over resources of one or more regions (e.g., as indicated by uplink data region 205, uplink control region 210, downlink data region 215, downlink control region 220, or any combination thereof). In some cases, bandwidth 225 may be an example of a single frequency band or carrier allocated for both uplink and downlink communications (e.g., the single frequency band may be allocated for both uplink communications and downlink communications, for example, using a TDD mode or FDD mode). For example, bandwidth 225 (e.g., frequency band) used for uplink communications may be the same as the frequency band used for downlink communications, for example, in accordance with a TDD mode.

In some cases, multiple different BWPs may span the bandwidth 225 to allow uplink and downlink communications concurrently (e.g., at least partially overlapping in time) for UE 115-a. In some examples, bandwidth 225 may be an example of a single carrier in the unpaired spectrum. In some cases, bandwidth 225 may be separated into one or more BWPs (e.g., BWPs 230-a, 230-b, and 230-c) and the base station 105-a may indicate a BWP for receiving a downlink communication (e.g., a PDSCH transmission via the downlink data region 215) or for transmitting an uplink communication (e.g., a PUSCH transmission via the uplink data region 205) to UE 115-a for example, in accordance with an FDD mode. Frequency guard bands may be located between BWPs 230 to minimize signaling interference. In some cases, base station 105-a may partition bandwidth 225 into different sized BWPs 230. For example, base station 105-a may partition the bandwidth 225 (e.g., an 80 MHz bandwidth) into a first BWP 230-a with a first size (e.g., 40 MHz), a second BWP 230-b with a second size (e.g., 20 MHz), and a third BWP 230-c with a third size (e.g., 20 MHz). Each BWP 230 may be separated into one or more subbands that may allow concurrent (or at least partially overlapping in time) uplink and downlink communication for a UE 115-a. For example, base station 105-a may indicate a subband of the BWP 230 for receiving a downlink communication (e.g., a PDSCH transmission via the downlink data region 215) or for transmitting an uplink communication (e.g., a PUSCH transmission via the uplink data region 205) to the UE 115-a for example, in accordance with an FDD mode.

In some cases, UE 115-a and base station 105-a may communicate according to one or more operation modes (e.g., an FDD operation mode, a TDD operation mode, or both), over one or more BWPs 230. For example, base station 105-a may transmit control signaling to UE 115-a on bandwidth 225 in an unpaired radio frequency spectrum. In some examples, the control signaling may indicate (e.g., configure) UE 115-a with one or more BWPs 230 associated with one or more operation modes from bandwidth 225. For example, the control signaling may indicate one or more downlink BWPs 230 for operation in the TDD mode, one or more uplink BWPs 230 for operation in the TDD mode, or both. Additionally, or alternatively, separate BWPs 230 may provide operation in FDD mode as each BWP 230 may receive an indication for receiving a downlink communication (e.g., a PDSCH transmission via the downlink data region 215) or for transmitting an uplink communication (e.g., a PUSCH transmission via the uplink data region 205) to UE 115-a. For example, in time periods 235-a and 235-d, UE 115-a may receive messages (e.g., downlink or uplink) on BWPs 230-a, 230-b, or 230-c any combination. In time periods 235-b and 235-c, UE 115-a may receive and transmit messages over separate BWPs 230 (e.g., UE 115-a may receive PDSCH transmissions via the downlink data region 215 over BWPs 230-a and 230-c, UE 115-a may transmit PUSCH transmissions via the uplink data region 205 over BWP 230-b). Such a communication configuration may be referred to a SBFD configuration.

In some examples, UE 115-a may receive DCI from the base station 105 (e.g., via downlink control region 220) indicating a BWP for receiving a downlink communication (e.g., a PDSCH transmission via the downlink data region 215) or for transmitting an uplink communication (e.g., a PUSCH transmission via the uplink data region 205). For example, base station 105-a may transmit DCI to UE 115-a via downlink control region 220 for each physical channel. For instance, base station 105-a may schedule FDRA (e.g., a PDSCH resource) of a first physical channel through a first DCI over a first BWP 230 (e.g., BWP 230-a) and FDRA (e.g., a PUSCH resource) of a second physical channel through a second DCI over a second BWP 230 (e.g., BWP 230-b). In some examples, however, transmitting multiple DCI messages may result in increased signaling overhead and decoding complexity at the base station 105-a and the UE 115-a. For example, in the case that UE 115-a receives multiple DCI messages, UE 115-a may decode and perform an error check, such as a cyclic redundancy check (CRC), for each DCI that UE 115-a receives, which may increase the number of processing operations that UE 115-a performs.

According to various aspects, base station 105-a may jointly schedule multiple physical channels (e.g., PDSCH and PUSCH) between base station 105-a and UE 115-a (e.g., in an unpaired radio frequency spectrum band). For example, base station 105-a may transmit a joint control message that may include scheduling information for a downlink message to be received by the UE 115-a and an uplink message to be transmitted by the UE 115-a. In some cases, the scheduling information allocates first resources for the downlink message that at least partially overlap second resources for the uplink message in at least one of time or frequency. In some cases, the joint control message may be received via RRC signaling, a MAC-CE, or DCI. In some examples, the joint DCI may provide timing information within a TDRA field or frequency information within an FDRA field, which may indicate time-frequency resources for both the downlink and uplink message for the UE 115-a.

The joint DCI may utilize different DCI formats for providing such information. For example, the joint DCI may have a DCI format 0_0, which may include parameters such as an identifier for DCI formats, FDRA, TDRA, frequency hopping flag, modulation and coding scheme (MCS), new data indicator, redundancy version, HARQ process number, transmit power control (TPC) command for scheduled PUSCH, and uplink/supplementary uplink indicator. In other examples, the joint DCI may have a DCI format 1_0, which may include parameters such as an identifier for DCI formats, FDRA, TDRA, virtual RB (VRB) to physical RB (PRB) mapping, MCS, new data indicator, redundancy version, HARQ process number, downlink assignment index (DAI), TPC command for scheduled physical uplink control channel (PUCCH), PUCCH resource indicator, and PDSCH-to-HARQ feedback timing indicator. In some examples, an FDRA may be configured in accordance with one or more resource assignment types (e.g., type-0, type-1, or dynamic).

In some examples, UE 115-a may determine timing information for the downlink message and the uplink message. In some cases, the downlink timing information may be timing parameters of a TDRA field in the joint control message. Additionally, or alternatively, the uplink timing information may be timing parameters associated with or determined based on the TDRA field, the downlink timing information, higher layer signaling, or other information. In some examples, the TDRA field may indicate a starting symbol, length value, a slot offset, a mapping type, or any combination thereof for each of the uplink and downlink messages.

In some aspects, DCI may indicate a TDRA for PDSCH using a number of the MSBs or LSBs of a TDRA bit field in the DCI. The MSB of the TDRA field may indicate one or more characteristics of the PDSCH (e.g., starting symbol, length value, slot offset, mapping type). For example, the MSB of the TDRA field may map to a predefined index for TDRA of the PDSCH. Additionally, some bits of the DCI may indicate one or more characteristics of the PUSCH (e.g., starting symbol, transmission allocation length, transmission slot, mapping type, number of transmission repetitions).

In some examples, the timing information of the PDSCH may be used by the UE 115-a to determine timing information of the PUSCH. For instance, the starting symbol value of a downlink message may be used to obtain the starting symbol, length value, or slot offset or a combination thereof an uplink message. Additionally, a TDRA parameter for the uplink message may configured through higher layer signaling or dynamically indicated from a configured set. For example, a base station 105-a may transmit a control message indicating a delta symbol value $\Delta_S$ associated with the timing information for the uplink message. The delta symbol value $\Delta_S$ may be used to calculate a starting symbol of an uplink message. In some examples, a base station may transmit a control message indicating a delta slot value $\Delta_K$ associated with the timing information for the uplink message. The delta slot value $\Delta_K$ may be used to calculate a slot for transmission of the uplink message. In some examples, a base station may transmit a length indicator which may determine a symbol length for the uplink message. These parameters, among others, may be used by the UE 115-a to determine timing information for the uplink message.

In some examples, the UE 115-a may determine frequency information for a downlink message (e.g., a communication via a downlink data region 215) and an uplink message (e.g., a communication via an uplink data region 205). In some cases, the frequency information may be frequency parameters identified based on an FDRA field in a joint control message (e.g., joint DCI). For example, the frequency information may indicate parameters such as a starting frequency allocation location (e.g., an index of an RB or RB group (RBG)), a length of the frequency allocation (e.g., a quantity of RBs or RBG scheduled for the channel), an offset between a subband the control message was received and a scheduled downlink or uplink message, among other examples frequency parameters.

The UE 115-a may receive the joint control message that includes scheduling information (e.g., resource allocations) for a downlink message and an uplink message. The joint control message may include an FDRA indication. The UE 115-a may determine one or more frequency domain resource allocations (e.g., BWPs 230 for uplink data region 205 and downlink data region 215) based on the FDRA indication.

In some examples, the FDRA indication may be an example of a bitmap. The bitmap may correspond to a frequency bandwidth 225 that includes uplink BWPs 230 and downlink BWPs 230 scheduled for communications between the base station 105-a and the UE 115-a. Each bit of the bitmap may indicate an RBG allocation for such communications. The UE 115-a may determine BWPs 230 for receiving downlink messages based on an indicated RBG allocation being within a configured downlink portion of the frequency bandwidth 225. Additionally, or alternatively, the UE 115-a may determine BWPs 230 for transmitting uplink messages based on an indicated RBG allocation being within a configured uplink portion of the frequency bandwidth 225. In such examples, a single FDRA field in DCI (e.g., the bitmap) may indicate both uplink and downlink frequency allocations.

In some examples, the FDRA indication may be an example of a resource indicator value (RIV). The UE 115-a may determine first frequency information associated with a downlink allocation or an uplink allocation based on the FDRA (e.g., a starting RB and a quantity of consecutive allocated RBs for uplink or downlink messages may be determined from all or a portion of the FDRA). In some examples, the FDRA bit field may indicate an uplink frequency allocation for one or more uplink BWPs 230. In some other examples, the FDRA bit field may indicate a downlink frequency allocation for one or more downlink BWPs 230 (e.g., if a bit field size indicating a downlink BWP 230 is smaller than a bit field size indicating the uplink BWP 230, for example, due to a size of the downlink BWP 230 being smaller than the size of the uplink BWP 230).

The UE 115-a may determine second frequency information based on determining the first frequency information. For example, the UE 115-a may identify one or more adjustment factors for determining the second frequency information. In some examples, the UE 115-a may determine an adjustment factor based on one or more pre-configured rules (e.g., a scaling parameter K may be determined based on a size of a downlink BWP 230 and a size of an uplink BWP 230). Additionally, or alternatively, the UE 115-a may determine an adjustment factor based on a subset of bits of the FDRA indication. For example, a first subset of bits of the FDRA indication, X, may indicate the first frequency information and a second subset of bits of the FDRA indication, Y, may indicate the adjustment factors for determining the second frequency information (e.g., a scaling parameter B and an offset parameter A may be dynamically selected and indicated by the second subset of bits of the FDRA indication). As an illustrative example, the UE 115-a may scale a frequency allocation of the first frequency information (e.g., multiply a scaling parameter by a quantity of RBs), offset a frequency allocation of the first frequency information (e.g., add or subtract a quantity of RBs from a starting RB of the first frequency information), or a combination thereof to determine the second frequency information. In such examples, a single DCI message may indicate both uplink and downlink frequency allocations with a relatively small quantity of bits, which may result in more efficient communications.

In some examples, the UE 115-a may determine the second frequency information based on at least some bits of the FDRA indication that indicate the first frequency information. For example, the FDRA indication may include an indication of the first frequency information for an uplink message (or a downlink message), and some bits of the FDRA indication may be indicate the second frequency information in addition to indicating a portion of the first frequency information. For example, a quantity of MSBs or LSBs of the FDRA indication may be configured to indicate second frequency information for a downlink message (or uplink message). In some examples, the FDRA indication may indicate a frequency resource allocation for an uplink message or a downlink message based on comparing a bit field size associated with the uplink message and a bit field size associated with the downlink message. As an illustrative example, a quantity of bits to indicate a downlink BWP 230 using a first resource allocation type may be larger than a quantity of bits to indicate an uplink BWP 230 using the same or different resource allocation type. In such examples, the FDRA indication of the FDRA may indicate a frequency allocation for the downlink message and some bits of the FDRA indication may be configured to indicate a frequency allocation for the uplink message. Accordingly, a single DCI message may indicate both uplink and downlink frequency allocations, which may result in more efficient communications. Additionally, or alternatively, a resource assignment type for an uplink message may be configured independently from a resource assignment type for a downlink message, which may improve scheduling flexibility at the base station 105-a, among other benefits.

Figure 3:
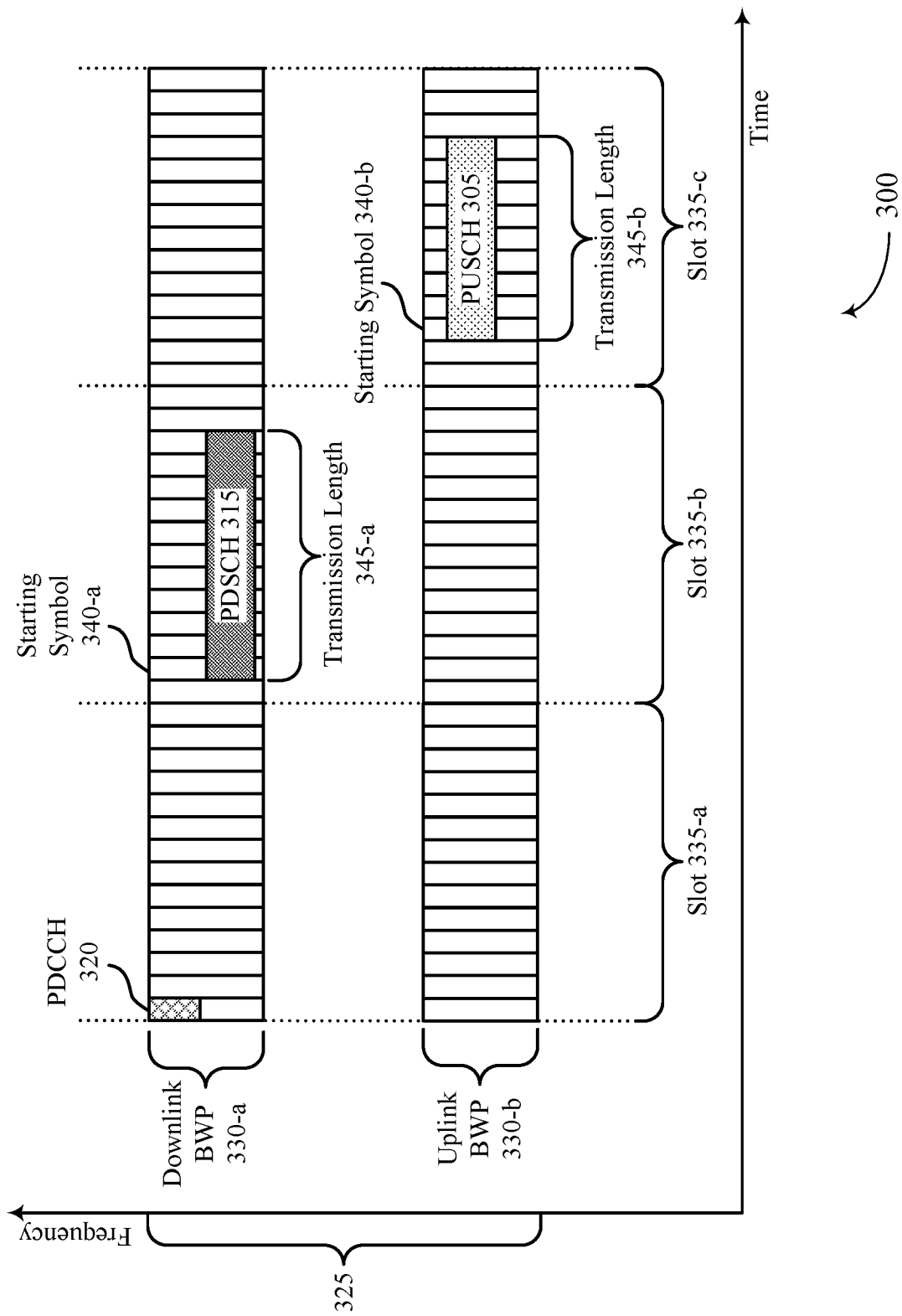
FIG. 3 illustrates an example of a time-frequency diagram that supports joint shared channel allocation in DCI in accordance with aspects of the present disclosure.

FIG. 3 illustrates an example of a time-frequency diagram 300 that supports joint shared channel allocation in DCI in accordance with aspects of the present disclosure. In some examples, time-frequency diagram 300 may be implemented by aspects of wireless communications systems 100 or 200.

In some cases, a UE may indicate one or more BWPs 330 over a carrier bandwidth to be used for communications with a base station. Additionally, the BWPs 330 may be selected for downlink or uplink transmissions. For instance, the UE may select, over carrier bandwidth 325, BWP 330-a for receiving downlink communications and BWP 330-b for transmitting uplink communications to a base station. In some examples, the UE may receive messages from the base station via one or more subbands of the downlink BWP 330-a. Additionally, or alternatively, the UE may transmit messages to the base station via one or more subbands of the uplink BWP 330-b. In some cases, DCI (e.g., via PDCCH 320) may indicate the direction of communications of the BWP 330 (e.g., downlink or uplink).

In some examples, the base station may indicate TDRA scheduling information for a downlink message through a control message (e.g., DCI). For instance, the DCI may be transmitted to the UE via PDCCH 320. In some examples, a first number of MSBs in the DCI TRDA bit field may indicate TDRA for PDSCH 315. In other examples, the LSBs in the DCI TRDA bit field may indicate TDRA for PDSCH 315. The value of the MSBs may provide a row index to an allocation table for PDSCH 315. The row index may be calculated by adding 1 to the value of the MSBs. For example, a first number (e.g., number=3) of MSBs in the DCI TRDA field may indicate TDRA timing information for a downlink message. The value of the MSBs (e.g., 5) may provide a row index (e.g., 6) to an allocation table for PDSCH 315. The allocation table may then set timing information of PDSCH 315 such as starting symbol 340-a $S_{PDSCH}$ (e.g., $S_{PDSCH}=2$), transmission length 345-a $L_{PDSCH}$ (e.g., $L_{PDSCH}=11$), slot offset $K_0$ (e.g., $K_0=1$), and PDSCH mapping type $K_{PDSCH}$ (e.g., demodulation reference signal (DMRS) mapping type $K_{PDSCH}=A$).

The UE may expect to receive the downlink message in a downlink slot $K_{DL}$. In some examples, downlink slot $K_{DL}$ may be represented by Equation 1:

$$K_{DL} = \left\lfloor n \frac{2^{\mu_{PDSCH}}}{2^{\mu_{PDCCH}}} \right\rfloor + K_0 \qquad (1)$$

In Equation 1, n may represent the slot of the scheduling DCI. The $\mu_{PDSCH}$ may represent the subcarrier spacing configurations for PDSCH 315 and $\mu_{PDCCH}$ may represent the subcarrier spacing configurations for PDCCH 320. As an illustrative example of implementing Equation 1, slot 335-a may represent slot n, slot 335-b may represent slot n+1, and slot 335-c may represent slot n+2. If the subcarrier spacing of the PDSCH 315 and PDCCH 320 are equal (e.g., 30 kHz), and the slot offset $K_0$ equals 1, then the PDSCH 315 allocation for the downlink message may begin in slot n+1 (e.g., slot 335-b).

In some cases, a base station may transmit a joint control message to a UE that indicates resource allocation information for both an uplink message transmitting to the UE and a downlink message being received by the UE. The joint control message may include DCI for TDRA timing information of multiple physical channels (e.g., PDSCH 315, PUSCH 305). For example, the base station may transmit a joint DCI (e.g., via PDCCH 320) that includes a TDRA field indicating timing information (e.g., starting symbol, transmission length, slot index, mapping type) for a downlink message to be received by the UE 115. Additionally, based on the timing information for the downlink message, the UE 115 may determine timing information (e.g., starting symbol, transmission length, slot index, mapping type) for the uplink message.

In some examples, the timing information of a downlink message may be used by the UE to determine the starting symbol 340-b $S_{PUSCH}$. In some examples, starting symbol 340-b $S_{PUSCH}$ may be represented by either Equation 2 or Equation 3:

$$S_{PUSCH} = (S_{PDSCH} + \Delta_S) \bmod 14 \qquad (2)$$

$$S_{PUSCH} = (S_{PDCCH} + \Delta_S) \bmod 14 \qquad (3)$$

In Equation 2, $S_{PDSCH}$ may represent the starting symbol 340-a of the downlink message. In Equation 3, $S_{PDCCH}$ may represent the starting symbol of the DCI (e.g., starting symbol of PDCCH 320). The delta symbol value $\Delta_S$ in both Equations 2 and 3 may provide more flexibility when setting the $S_{PUSCH}$. For example, if the starting symbol 340-b $S_{PUSCH}$ may be configured using Equation 2, starting symbol 340-a $S_{PDSCH}$ equals 2, and the delta symbol value $\Delta_S$ equals 1, then the starting symbol 340-b $S_{PUSCH}$ equals 3. In other examples, if starting symbol 340-b $S_{PUSCH}$ may be configured using Equation 3, the starting symbol of the DCI $S_{PDCCH}$ equals 1, and the delta symbol value $\Delta_S$ equals 1, then the starting symbol 340-b $S_{PUSCH}$ equals 2. The delta symbol value $\Delta_S$ may be configured via higher layer signaling. For instance, the UE may receive a message (e.g., RRC signaling, a MAC-CE, or DCI) from the base station indicating a delta symbol value $\Delta_S$. The delta symbol value $\Delta_S$ may also be indicated in the joint control message. Additionally, or alternatively, the delta symbol value $\Delta_S$ may be dynamically indicated from a configured set. For example, the base station or UE may select the delta symbol value $\Delta_S$ from the set of delta symbol values based on the set of bits in the DCI. For instance, the DCI may configure 2 bits for the delta symbol value $\Delta_S$. The delta symbol value $\Delta_S$ bits may map to a configured set of values (e.g., {0,4,7,11}). In some cases, the UE or base station may check for error cases in scheduling messages. For instance, an uplink message scheduled sooner than $N_2$ symbols after a downlink message.

In some examples, the timing information of a downlink message may be used by the UE to determine the PUSCH 305 transmission slot $K_2$ of an uplink message. In some examples, the PUSCH 305 transmission slot $K_2$ may be represented by Equation 4:

$$K_2 = \left\lfloor K_{DL} \frac{2^{\mu_{PUSCH}}}{2^{\mu_{PDSCH}}} \right\rfloor + \left\lfloor \frac{S_{PDSCH} + \Delta_S}{14} \right\rfloor + \Delta_K \quad (4)$$

In Equation 4, $K_{DL}$ may represent the downlink slot of the downlink message. The $\mu_{PUSCH}$ may represent the subcarrier spacing configurations for PUSCH 305 and $\mu_{PDSCH}$ may represent the subcarrier spacing configurations for PDSCH 315. $S_{PDSCH}$ may represent the starting symbol 340-a of the downlink message, and the delta symbol value $\Delta_S$ may represent a higher layer signaled variable. The delta slot value $\Delta_K$ in Equation 4 may provide more flexibility when setting transmission slot $K_2$. As an illustrative example of implementing Equation 4, slot 335-a may represent slot n, slot 335-b may represent slot n+1, and slot 335-c may represent slot n+2. If the subcarrier spacing of the PDSCH 315 and PDCCH 320 are equal (e.g., 30 kHz), $K_{DL}$ equals n+1, starting symbol 340-b $S_{PDSCH}$ equals 2, the delta symbol value $\Delta_S$ equals 1, and the delta slot value $\Delta_K$ equals 1, then the PUSCH 305 allocation for the uplink message may begin in slot n+2 (e.g., slot 335-c). The delta slot value $\Delta_K$ may be configured via higher layer signaling. For instance, the UE may receive a message (e.g., RRC signaling, a MAC-CE, or DCI) from the base station indicating a delta slot value $\Delta_K$. The delta slot value $\Delta_K$ may also be indicated in the joint control message. Additionally, or alternatively, the delta slot value $\Delta_K$ may be dynamically indicated from a configured set. For example, the base station or UE may select the delta slot value $\Delta_K$ from the set of delta slot values based on the set of bits in the DCI. For instance, the DCI may configure 1 bit for the delta slot value $\Delta_K$. The delta slot value $\Delta_K$ bit may map to a configured set of values (e.g., {0,1}).

In some examples, the timing information of a downlink message may be used by the UE to determine a transmission length 345-b of the uplink message. A length indicator $L_{PUSCH}$ may be used to determine the transmission length 345-b (e.g., the nominal duration) for the PUSCH 305. In some cases, the length indicator $L_{PUSCH}$ may explicitly indicate the number of symbols of the transmission length 345-b and the length indicator $L_{PUSCH}$ may be configured via higher layer signaling. For instance, the UE may receive a message (e.g., RRC signaling, a MAC-CE, or DCI) from the base station indicating a length indicator $L_{PUSCH}$. The length indicator $L_{PUSCH}$ may, in some cases, be indicated in the joint control message (e.g., PDCCH 320). Additionally, or alternatively, the length indicator $L_{PUSCH}$ may be dynamically indicated from a configured set. For example, the length indicator $L_{PUSCH}$ may correspond to a set of symbol values and the UE or base station may select the transmission length 345-b from the set of symbol values. In some aspects, the DCI may configure 2 bits for delta-s, which may map to a configured set of values (e.g., {4, 7, 11, 14}). In some cases, the length indicator $L_{PUSCH}$ may be based on the starting symbol 340-b determined for PUSCH 305. For instance, if the starting symbol 340-b is less than 7, then the sum of the starting symbol 340-b and the transmission length 345-b is 14 symbols. Otherwise, the sum of the starting symbol 340-b and the transmission length 345-b is 21 symbols.

According to some aspects, a mapping type (e.g., Type A or Type B) may be determines for the DMRS for PUSCH 305. In some examples, only one mapping type, such as one of Type A or Type B, is supported for DMRS for PUSCH 305. In other examples, Type A may be supported based on bits of a DCI field (e.g., contained within PDCCH 320), the starting symbol 340-b, or the transmission length 345-b. For instance, if the first X bits of the TDRA field within DCI carried via PDCCH 320 may indicate that mapping Type A is supported. Additionally, or alternatively, if the starting symbol 340-b is symbol index 0 (the first symbol in slot 335-c) and the sum of the starting symbol 340-b and the transmission length 345-b is determined to be greater than 4 symbols, DMRS mapping Type A may be supported and used for transmission of PUSCH 305.

In some examples, a number of repetitions of PUSCH 305 may be determined by the UE or base station. For example, DCI may be used to dynamically indicate the number of repetitions for PUSCH 305, which may be represented as $K_{PUSCH}$. In some cases, $K_{PUSCH}$ may be the same as the number of repetitions for PDSCH 315, $K_{PDSCH}$, and may be indicated to the UE via DCI (e.g., one or more bits within DCI carried by PDCCH 320 may indicate to the UE that the number of repetitions for PDSCH 315 and PUSCH 305 are the same). In some examples, a UE may be configured with a fixed value that may be used to determine $K_{PUSCH}$ based on $K_{PDSCH}$ such that the fixed value is added to $K_{PDSCH}$ to determine $K_{PUSCH}$. For example, the fixed value may be 1 and in an illustrative example, if $K_{PDSCH}$ is 2 repetitions, $K_{PUSCH}$ may be the sum of $K_{PDSCH}$ and the fixed value (in this case, 2+1=3 repetitions for $K_{PUSCH}$). Such techniques may utilize the reciprocity between uplink and downlink in the unpaired spectrum. Additionally, or alternatively, $K_{PUSCH}$ may configured via higher layer signaling. For example, the UE may receive a message (e.g., RRC signaling, a MAC-CE, or DCI) from the base station indicating the number of repetitions for PUSCH 305 $K_{PUSCH}$.

Based on the timing information determined for PUSCH 305 and PDSCH 315, the UE may transmit PUSCH 305 in accordance with the uplink timing information and may receive PDSCH 315 in accordance with the downlink timing information.

Figure 4:
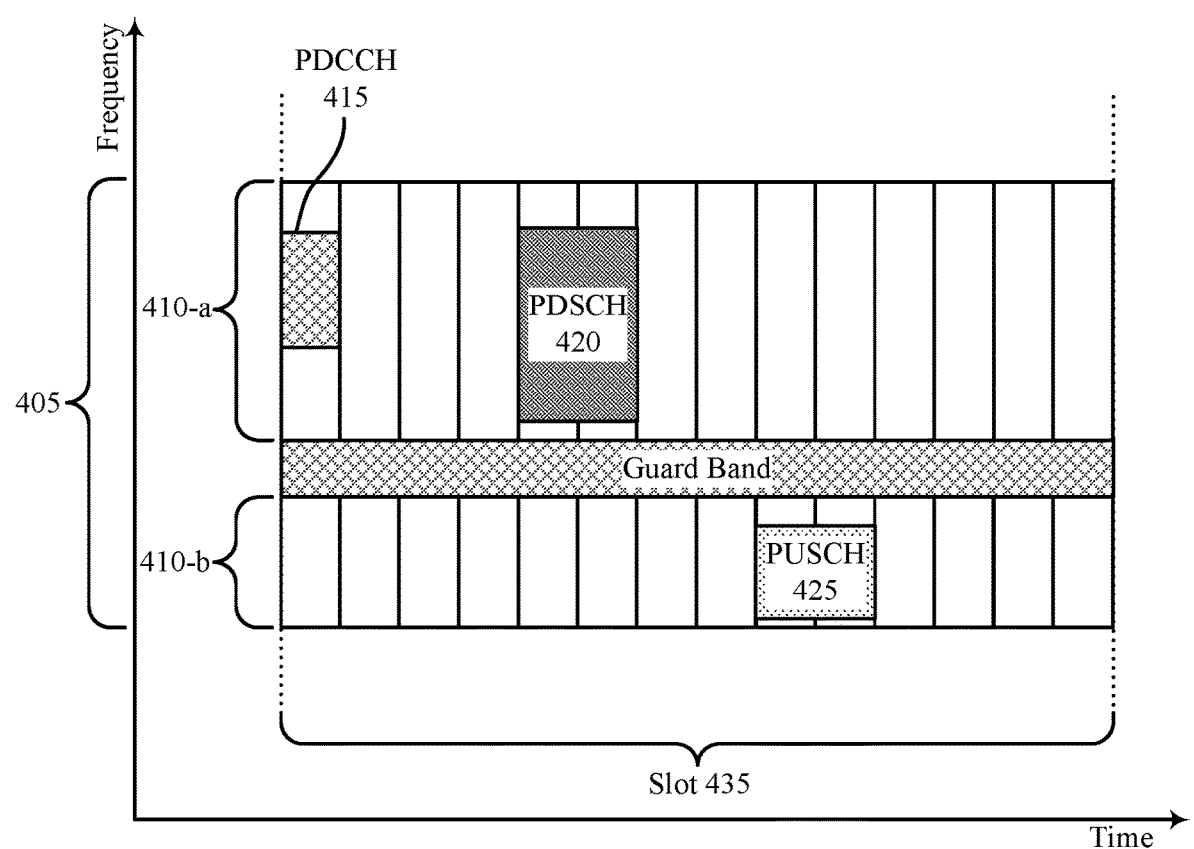
FIG. 4 illustrates an example of a time-frequency diagram that supports joint shared channel allocation in DCI in accordance with aspects of the present disclosure.

FIG. 4 illustrates an example of a time-frequency diagram 400 that supports joint shared channel frequency allocation in DCI in accordance with aspects of the present disclosure. In some examples, time-frequency diagram 400 may implement aspects of wireless communications systems 100 and 200. For example, the time-frequency diagram 400 may be an example of communications between a base station 105 and a UE 115 as described with reference to FIGS. 1 and 2. The time-frequency diagram 400 may illustrate an example of a joint control message scheduling uplink and downlink communications. For example, DCI transmitted in a PDCCH message 415 may indicate time-frequency resources for the PDSCH message 420 and the PUSCH message 425 as described herein.

A base station may transmit the PDCCH message 415 (e.g., a joint control message) including an FDRA field, a TDRA field, or both. The FDRA field may indicate both uplink frequency information and downlink frequency information. For example, a UE may receive the PDCCH message 415 that includes scheduling information (e.g., resource allocations) for a PDSCH message 420 and a PUSCH message 425. The PDCCH message 415 may include an FDRA indication. The UE may determine one or more frequency domain resource allocations based on the FDRA indication. For example, the UE may use the FDRA indication to determine a frequency range (e.g., a subband) to transmit the PDSCH message 420 in a BWP 410-a and a frequency range to receive the PUSCH message 425 in a BWP 410-b.

In some examples, the FDRA may be configured to be a type-0, a type-1, or a dynamic resource allocation type. For example, the FDRA may be type-0 and the frequency resource allocation may be in the form of a bitmap, where each bit of the bitmap may correspond to a nominal RBG allocation of a quantity of consecutive RBs. In some examples, the quantity of consecutive RBs may be configured or may depend on a size of a BWP 410 associated with the frequency allocation. Additionally, or alternatively, the FDRA may be type-1 and the frequency resource allocation may be in the form of a consecutive RB allocation (e.g., determined in accordance with a RIV equation), where a starting RB and a quantity of consecutive (e.g., consecutive in frequency, or time) allocated RBs are determined based on the FDRA. In some examples, the type-1 FDRA may be supported by a fallback DCI procedure.

In some examples, the FDRA may correspond to both first frequency information for a downlink message (e.g., the PDSCH message 420) and second frequency information for an uplink message (e.g., the PUSCH message 425). For example, the FDRA may be a type-0 and may include a bitmap. The bitmap may be defined over a bandwidth 405 covering all of the configured (e.g., scheduled) uplink and downlink BWPs 410 (e.g., the uplink BWP 410-b and the downlink BWP 410-a) in the slot 435. A bit in the bitmap may indicate that an associated RBG is allocated for communications (e.g., a value of 0 may indicate that the associated RBG is allocated for communications and a value of 1 may indicate that the associated RBG is not allocated for communications). The UE may be configured to determine whether the RBG is allocated for a downlink message or an uplink message based on a location of the RBG in the bandwidth 405. For example, if the RBG with a flagged bit (e.g., a bit with a value of 1) indicating an allocation is within the BWP 410-a corresponding to downlink communications, the UE may determine that the allocation is for a PDSCH message 420. If the RBG with a flagged bit (e.g., a bit with a value of 1) indicating an allocation is within the BWP 410-b corresponding to uplink communications, the UE may determine that the allocation is for a PUSCH message 425. Accordingly, a single FDRA field in DCI may indicate both uplink and downlink resource allocation. In some examples, a bit field size of an FDRA including a bitmap for both uplink and downlink allocations may be larger than a bit field size of an FDRA including a bitmap for one of the uplink or downlink communications.

In some examples, the UE may determine first frequency information associated with a downlink allocation or an uplink allocation based on the FDRA. For example, the FDRA may indicate resource allocation information. In some examples, the first frequency information may correspond to an uplink allocation (e.g., the FDRA may indicate frequency information for the PUSCH message 425 in the BWP 410-b). In some other examples, the first frequency information may correspond to a downlink allocation (e.g., the FDRA may indicate frequency information for the PDSCH message 420 in the BWP 410-a). The UE may be configured to determine the first frequency for the uplink allocation or the downlink allocation based on one or more sizes of the BWPs 410. For example, the UE may compare a size of the BWP 410-a (e.g., a quantity of physical RBs of the BWP 410-a) associated with downlink communications to a size of the BWP 410-b associated with uplink communications. The UE may determine that the first frequency information corresponds to the uplink allocation based on the size of the BWP 410-b being smaller (or larger) than the size of the BWP 410-a. Alternatively, the UE may determine that the first frequency information corresponds to the downlink allocation based on the size of the BWP 410-a being smaller (or larger) than the size of the BWP 410-a. In some examples, a relatively smaller BWP 410 may use fewer bits in an FDRA indication (e.g., a relatively smaller bit field of the FDRA may be realized). In some examples, determining the first frequency information comprises determining the frequency information in accordance with a RIV equation (e.g., for a type 1 resource allocation).

In some examples, the UE may determine second frequency information based on determining the first frequency information. For example, the UE may identify one or more adjustment factors for determining the second frequency information. In some examples, the UE may determine an adjustment factor based on one or more pre-configured rules (e.g., rules configured by RRC signaling or a configuration of the UE). As an illustrative example, the UE may identify a scaling parameter (e.g., a scaling parameter K) based on a size of a downlink BWP 410-a and a size of an uplink BWP 410-b. For example, K may be a maximum value from a set of values, such as 1, 2, 4, 8, etc., that satisfies an equation $$K \leq \left\lfloor \frac{DL_{BWP}}{UL_{BWP}} \right\rfloor$$

where $DL_{BWP}$ represents the size of the downlink BWP 410-a and $UL_{BWP}$ represents the size of the uplink BWP 410-b (e.g., a quantity of physical RBs of the BWP 410-b).

Additionally, or alternatively, the UE may determine an adjustment factor based on a subset of bits of an FDRA. For example, a first subset of bits of the FDRA (e.g., X MSBs or LSBs in the FDRA) may indicate the first frequency information and a second subset of bits of the FDRA (e.g., Y bits in the FDRA where the FDRA includes X+Y total bits) may indicate the adjustment factors for determining the second frequency information. For example, a scaling parameter B and an offset parameter A may be dynamically selected (e.g., by a base station), for example, from a higher layer configured set of parameters (e.g., A may be a value between 10 and 20, B may be a value of 1, among other examples of parameters). Such parameters may be indicated by the second subset of the FDRA (e.g., Y bits, such as 1 bit in the FDRA).

The UE may identify the second frequency information based on the first frequency information or the one or more adjustment factors. For example, the UE may identify the first frequency information from the FDRA and adjust the first frequency information to derive the second frequency information. As an illustrative example, the first frequency information may correspond to the uplink allocation, and the UE may scale a starting RB of the first frequency information to determine a starting RB of the second frequency information in accordance with by Equation 1:

$$RB_{S_{PDSCH}} = K * RB_{S_{PUSCH}} \quad (5)$$

In Equation 5, $RB_{S_{PDSCH}}$ may represent the starting RB of the PDSCH message 420, K may represent the scaling factor determined as described herein, and $RB_{S_{PUSCH}}$ may represent the starting RB of the PUSCH message 425. Additionally, or alternatively, the UE may scale the quantity of RBs of the first information to determine the quantity of RBs of the second frequency information, for example, in accordance with Equation 6:

$$L_{RB_{PDSCH}} = K * L_{RB_{PUSCH}} \quad (6)$$

In Equation 6, $L_{RB_{PDSCH}}$ may represent a frequency length in RBs of the PDSCH message 420 and $L_{RB_{PUSCH}}$ may represent a frequency length in RBs of the PUSCH message 425.

As another illustrative example of adjusting the first frequency information to determine the second frequency information, the UE may implement Equations 7 and 8:

$$L_{RB_{PDSCH}} = B * L_{RB_{PUSCH}} \quad (7)$$

$$RB_{S_{PDSCH}} = A + RB_{S_{PUSCH}} \quad (8)$$

In Equations 7 and 8, B may represent a scaling parameter and A may represent an offset parameter determined as described herein.

In some examples, the UE may determine the second frequency information based on the indication of the first frequency information. For example, the FDRA indication may include an indication of the first frequency information for the PUSCH message 425 (or the PDSCH message 420). The UE may be configured to determine that the first frequency information corresponds to the uplink allocation or the downlink allocation based on one or more bit field sizes. For example, the UE may compare a bit field size associated with the PDSCH message 420 (e.g., a quantity of bits resulting from a resource assignment type of a downlink allocation or a size of the BWP 410-a) to a bit field size associated with the PUSCH message 425 (e.g., a quantity of bits resulting from a resource assignment type of a downlink allocation or a size of the BWP 410-b). The UE may determine that the first frequency information corresponds to the uplink allocation based on the bit field size of the uplink allocation being larger than bit field size of the downlink allocation. Alternatively, the UE may determine that the first frequency information corresponds to the downlink allocation based on the bit field size of the downlink allocation being larger than bit field size of the uplink allocation.

In some examples, the subset of bits may be repurposed (e.g., by a base station) to indicate the secondary frequency information. For example, a subset of bits of the FDRA (e.g., Y LSBs or MSBs of the bit field of the FDRA) may be configured to indicate the second frequency information for the PDSCH message 420 (or the PUSCH message 425) in addition to indicating a portion of the first frequency information. In some examples, the quantity of bits included in the subset of bits may be based on a size of the BWP 410-a, a size of the BWP 410-b, a resource assignment type for the PUSCH message 425, a resource assignment type for the PDSCH message 420, or any combination thereof. In some examples, by implementing an FDRA to indicate the first frequency information and using a subset of bits of the FDRA to indicate the second frequency information, a resource assignment type for the PDSCH message 420 may be independently configured from the resource assignment type for the PUSCH message 425.

In some examples, the various operations described in the time-frequency diagram 400 may be performed in different orders or combinations, or may be performed by different devices. For example, operations performed by the UE may be performed by a base station, or operations performed by the base station may be performed by the UE, among other examples.

Figure 5A:
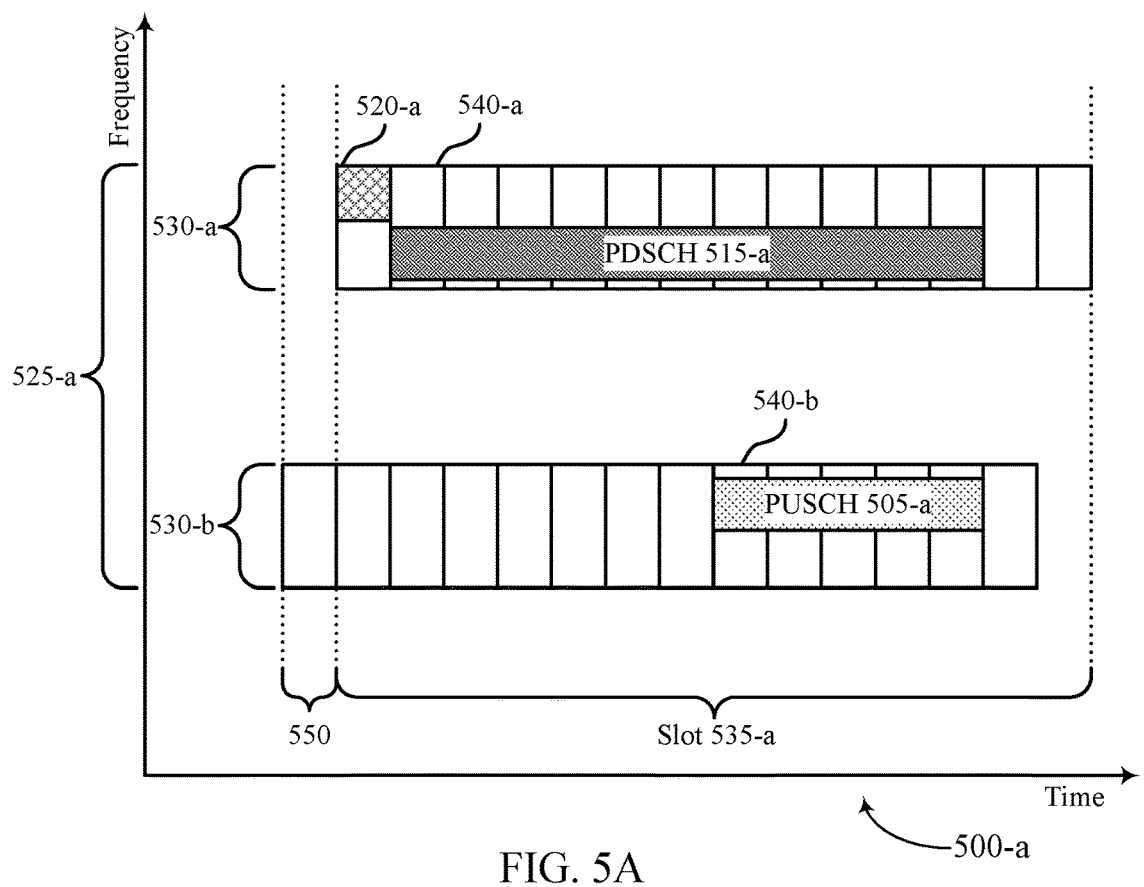
FIGS. 5A and 5B illustrate example time-frequency diagrams that support joint shared channel allocation in DCI in accordance with aspects of the present disclosure.
Figure 5B:
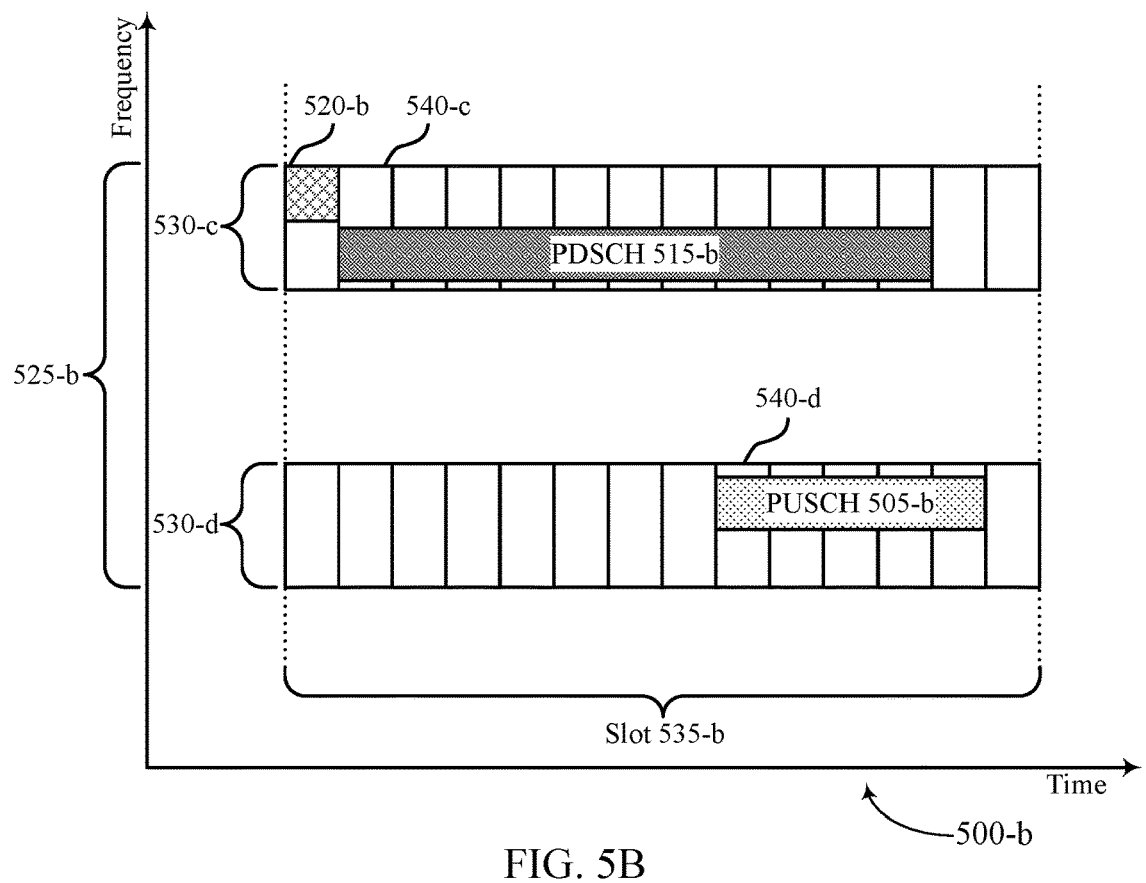

FIGS. 5A and 5B illustrate example time-frequency diagrams 500 that support joint shared channel allocation in DCI in accordance with aspects of the present disclosure. In some examples, time-frequency diagrams 500 may be implemented by aspects of wireless communications systems 100 or 200.

In FIG. 5A, a joint control message 520-a may schedule an uplink message such as a PUSCH 505-a to be transmitted by a UE and a downlink message such as a PDSCH 515-a to be transmitted to the UE from a base station. In some cases, the joint control message 520-a may be a PDCCH that carries joint DCI including a TDRA field that may be used by a UE to determine timing information for the PUSCH 505-a and the PDSCH 515-a.

In some aspects, PUSCH 505-a may be scheduled for transmission via BWP 530-b and PDSCH 515-a may be scheduled for transmission via BWP 530-a. BWP 530-a and BWP 530-b may be within the same carrier or bandwidth 525-a. In some cases, the timing information determined by the UE for transmitting the PUSCH 505-a may be timing information associated with when the base station expects to receive the PUSCH 505-a. In such cases, the slot 535-a at the UE may be misaligned in time with a corresponding slot from the base station perspective. As such, the UE may determine to apply a timing advance 550, which as shown spans 1 symbol length in duration, but may be any length in time, as part of transmitting the PUSCH 505-a to the base station so that the PUSCH 505-a arrives at the base station at the expected time.

In FIG. 5B, a joint control message 520-b may schedule an uplink message such as a PUSCH 505-b to be transmitted by a UE and a downlink message such as a PDSCH 515-b to be transmitted to the UE from a base station. In some cases, the joint control message 520-b may be a PDCCH that carries joint DCI including a TDRA field that may be used by a UE to determine timing information for the PUSCH 505-b and the PDSCH 515-b.

In some aspects, PUSCH 505-b may be scheduled for transmission via BWP 530-d and PDSCH 515-b may be scheduled for transmission via BWP 530-c. BWP 530-c and BWP 530-*d* may be within the same carrier or bandwidth 525-*b*. In some cases, the timing information determined by the UE for transmitting the PUSCH 505-*b* may be absolute timing information such that the slot 535-*b* at the UE is aligned in time with a corresponding slot from the base station perspective. As such, the UE may refrain from applying a timing advance, as done in FIG. 5A, as part of transmitting the PUSCH 505-*b* to the base station.

Figure 6:
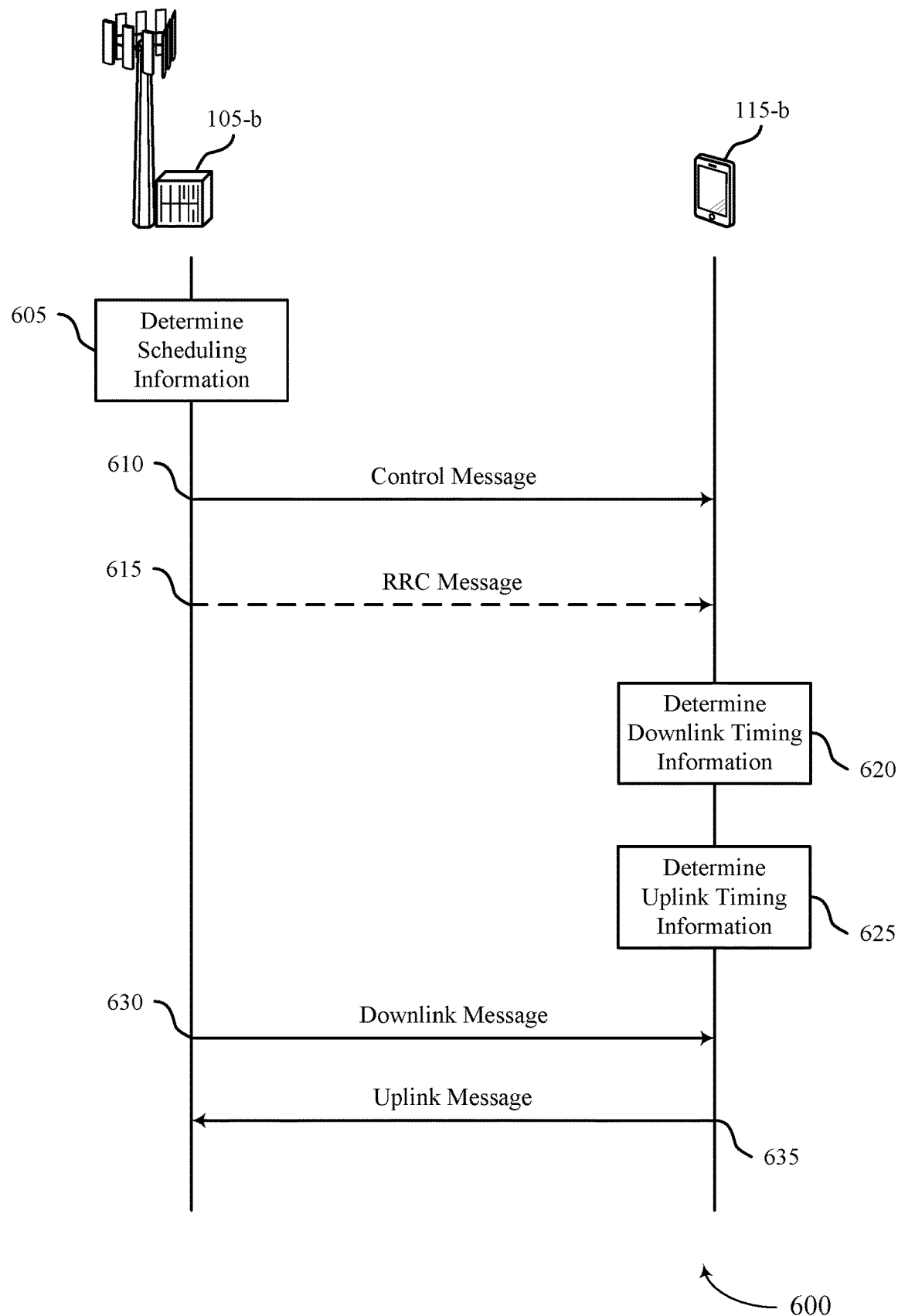
FIG. 6 illustrates an example of a process flow that supports joint shared channel allocation in DCI in accordance with aspects of the present disclosure.

FIG. 6 illustrates an example of a process flow 600 that supports joint shared channel allocation in DCI in accordance with aspects of the present disclosure. In some examples, process flow 600 may implement aspects of wireless communications systems 100 or 200. Process flow 600 may include a UE 115-*b* and a base station 105-*b*, which may be examples of corresponding devices as described herein. Alternative examples of the following may be implemented, where some steps are performed in a different order than described or are not performed at all. In some cases, steps may include additional features not mentioned below, or further steps may be added.

At 605, base station 105-*b* may determine scheduling information for the UE 115-*b*. The scheduling information may include information for a downlink message to be received by the UE 115-*b* and an uplink message to be transmitted by the UE 115-*b*. In some cases, the time-frequency resources for the uplink and downlink messages may at least partially overlap in one of time or frequency, or both. Additionally, or alternatively, the downlink message and the uplink message may be scheduled via the same carrier.

At 610, the base station 105-*b* may transmit a control message (e.g., a joint control message) to the UE 115-*b*. The control message may indicate the scheduling information for the uplink and downlink messages as determined by the base station 105-*b* at 605. In some examples, the base station 105-*b* may transmit generate a control channel, such as a PDCCH, that includes the control message. In some cases, the control message may be a joint DCI message that includes a TDRA field, which may indicate timing information for both the uplink and downlink messages for the UE 115-*b*. The control message may indicate an MCS for the downlink message, the uplink message, or both.

At 615, the base station 105-*b* may optionally transmit a message to the UE 115-*b*. For example, the base station 105-*b* may transmit a control channel such as a PDCCH that includes the message (e.g., in DCI), or the base station may transmit a message over the PDSCH (e.g., MAC-CE, RRC) to the UE 115-*b*. The message may be transmitted before or after the control message transmitted at 610. In some cases, the message may be included in the control message transmitted at 610. The message may indicate a delta value (e.g., a delta symbol value or a delta slot value) which may be used by the UE 115-*b* to determine timing information for the uplink message. In some cases, the message may indicate a set of delta values from which the UE 115-*b* selects a symbol or slot value when determining timing information for the uplink message. In some instances, the message may include a length indicator indicating the transmission length of the uplink message or a repetition index corresponding to a number of repetitions of the downlink or uplink message.

At 620, the UE 115-*b* may determine timing information for the downlink message based on the control message 610 and the optional RRC message transmitted at 615. For example, the UE 115-*b* may determine a starting symbol, a transmission length, or a slot for reception of the downlink message. In some cases, the timing information for the downlink message may be based on a TDRA field within the control message. The TDRA field may indicate a starting length indicator value (SLIV), mapping type for a DMRS, or a slot offset for reception of the downlink message.

At 625, the UE 115-*b* may determine timing information for the uplink message based on the control message 610, the downlink timing information determined at 620, or the optional RRC message transmitted at 615. For example, the UE 115-*b* may determine a starting symbol or transmission length of the uplink message based on timing information (e.g., starting symbol or transmission length) of the downlink message. In some cases, the UE 115—may determine timing information for the uplink message based on one or more delta values (e.g., delta slot value or delta symbol value), which may be indicated to the UE 115-*b* in the RRC message transmitted at 615. Additionally, or alternatively, the UE 115-*b* may determine a DMRS mapping type or number of repetitions of the uplink message based on timing information for the uplink message, the downlink message, or a number of repetitions of the downlink message.

At 630, the base station 105-*b* may transmit, and the UE 115-*b* may receive, the downlink message scheduled by the control message transmitted at 610. The downlink message may be carried in a PDSCH. The downlink message may be communicated based on the timing information included in the control message or determined by the UE 115-*b* at 620. In some examples, the downlink message may be received at the UE 115-*b* via a carrier that is different than the carrier used for transmission of the control message at 610.

At 635, the UE 115-*b* may transmit an uplink message to the base station 105-*b* scheduled by the control message transmitted at 610. The uplink message may be carried by a PUSCH. The uplink message may be transmitted based on the timing information included in the control message or determined by the UE 115-*b* at 625. In some examples, the uplink message may be transmitted by the UE 115-*b* via a carrier that is different than the carrier used for transmission of the control message at 610. In some cases, the uplink message may be transmitted via the same carrier as the downlink message received at 630 and may partially overlap in time with the downlink message. In some examples, the MCS used for the uplink message may be different than the MCS used for transmission of the downlink message. The MCS for the uplink message may be indicated by the control message transmitted at 610 or may be determined based on the MCS for the downlink message (which may be indicated by the control message transmitted at 610).

Figure 7:
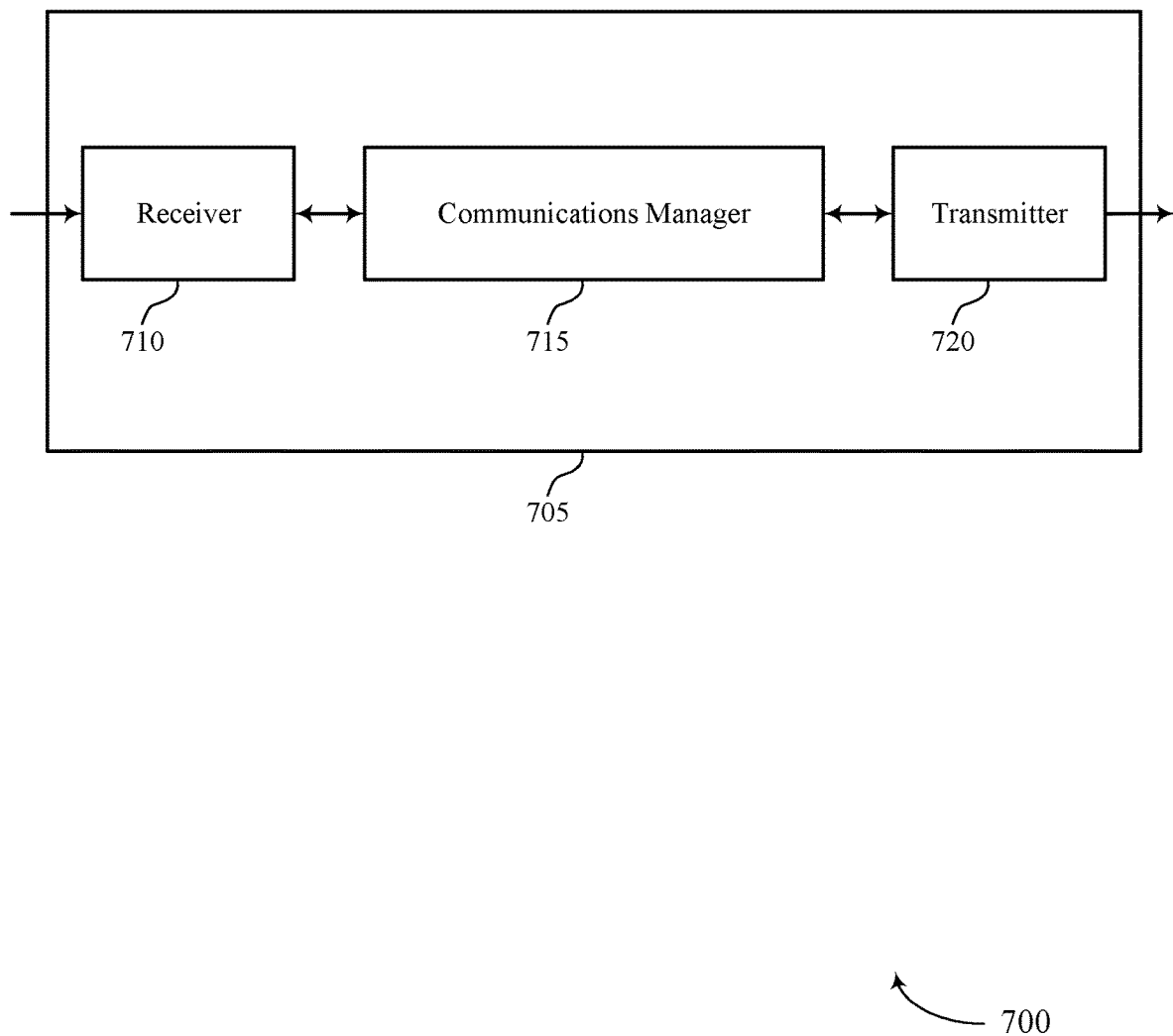
FIGS. 7 and 8 show block diagrams of devices that support joint shared channel allocation in DCI in accordance with aspects of the present disclosure.

FIG. 7 shows a block diagram 700 of a device 705 that supports joint shared channel allocation in DCI in accordance with aspects of the present disclosure. The device 705 may be an example of aspects of a UE 115 as described herein. The device 705 may include a receiver 710, a communications manager 715, and a transmitter 720. The device 705 may also include a processor. Each of these components may be in communication with one another (e.g., via one or more buses).

The receiver 710 may receive information such as packets, user data, or control information associated with various information channels (e.g., control channels, data channels, and information related to joint shared channel allocation in DCI, etc.). Information may be passed on to other components of the device 705. The receiver 710 may be an example of aspects of the transceiver 1020 described with reference to FIG. 10. The receiver 710 may utilize a single antenna or a set of antennas.

The communications manager 715 may receive, from a base station, a control message that includes scheduling information for a downlink message to be received by the UE and an uplink message to be transmitted by the UE, the scheduling information allocating first resources for the downlink message and second resources for the uplink message, determine timing information for the downlink message based on the scheduling information, determine timing information for the uplink message based on the timing information for the downlink message and the scheduling information, receive the downlink message using the first resources according to timing information for the downlink message that is determined based on the scheduling information, and transmit the uplink message using the second resources according to timing information for the uplink message that is determined based on the timing information for the downlink message and the scheduling information. In some examples, the first resources may at least partially overlap the second resources in at least one of time or frequency. The communications manager 715 may be an example of aspects of the communications manager 1010 described herein.

The communications manager 715, or its sub-components, may be implemented in hardware, code (e.g., software or firmware) executed by a processor, or any combination thereof. If implemented in code executed by a processor, the functions of the communications manager 715, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The communications manager 715, or its sub-components, may be physically located at various positions, including being distributed such that portions of functions are implemented at different physical locations by one or more physical components. In some examples, the communications manager 715, or its sub-components, may be a separate and distinct component in accordance with various aspects of the present disclosure. In some examples, the communications manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 720 may transmit signals generated by other components of the device 705. In some examples, the transmitter 720 may be collocated with a receiver 710 in a transceiver module. For example, the transmitter 720 may be an example of aspects of the transceiver 1020 described with reference to FIG. 10. The transmitter 720 may utilize a single antenna or a set of antennas.

In some examples, the communications manager 715 may be implemented as an integrated circuit or chipset for a mobile device modem, and the receiver 710 and transmitter 720 may be implemented as analog components (e.g., amplifiers, filters, antennas) coupled with the mobile device modem to enable wireless transmission and reception over one or more bands.

The communications manager 715 as described herein may be implemented to realize one or more potential advantages. One implementation may enable the device 705 to determine timing information (e.g., timing resource allocation information or parameters associated with a TDRA field) for uplink and downlink communications using a control message (e.g., joint DCI). Based on the techniques for determining timing information for both uplink and downlink messages (e.g., in a joint control message such as a joint DCI), the device 705 may more efficiently power a processor or one or more processing units associated with transmitting and receiving communications, which may enable the device to save power and increase battery life.

Figure 8:
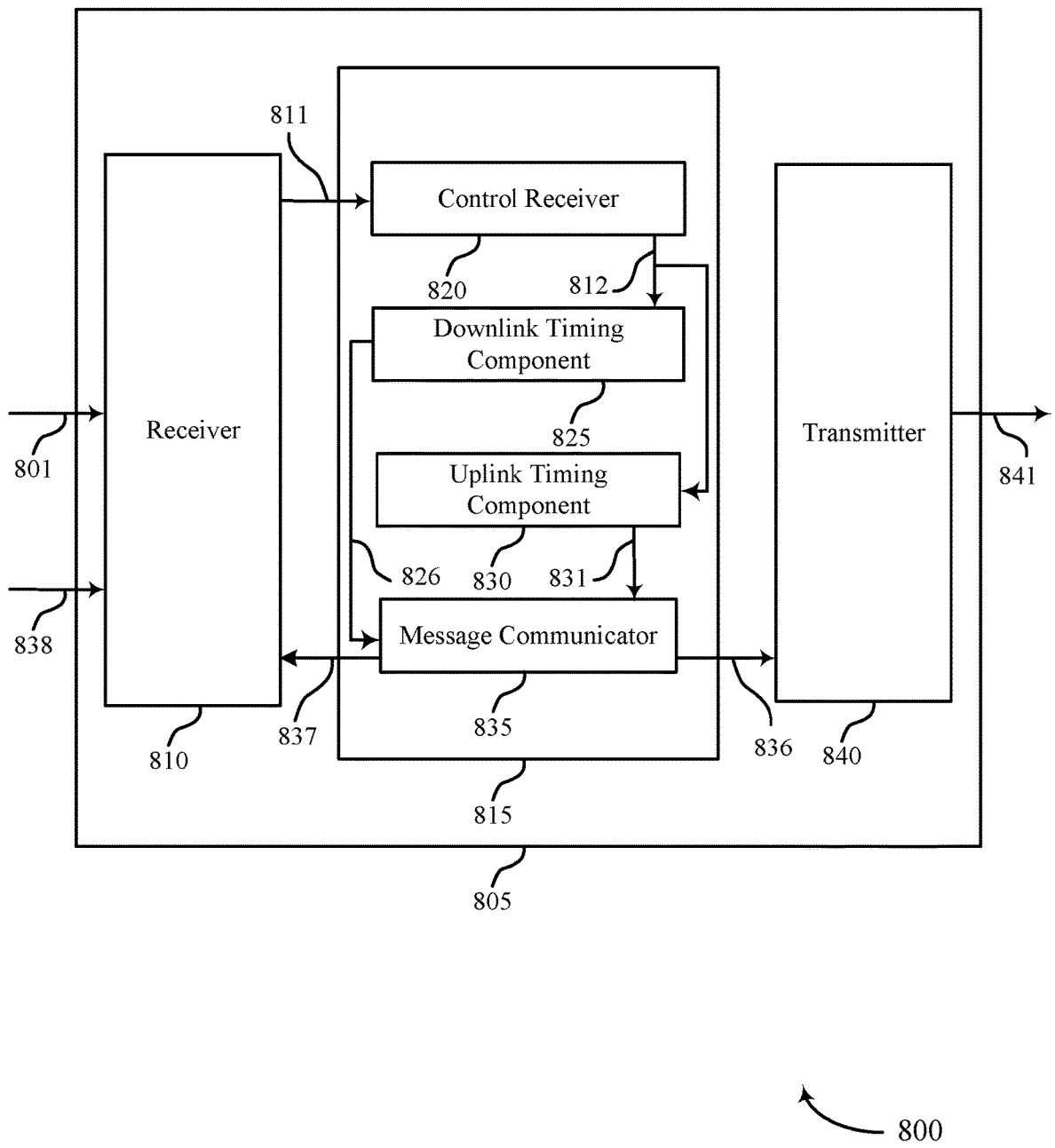

FIG. 8 shows a block diagram 800 of a device 805 that supports joint shared channel allocation in DCI in accordance with aspects of the present disclosure. The device 805 may be an example of aspects of a device 705 or a UE 115 as described herein. The device 805 may include a receiver 810, a communications manager 815, and a transmitter 840. The device 805 may also include a processor. Each of these components may be in communication with one another (e.g., via one or more buses).

The receiver 810 may receive information such as packets, user data, or control information associated with various information channels (e.g., control channels, data channels, and information related to joint shared channel allocation in DCI). Information may be passed on to other components of the device 805. The receiver 810 may be an example of aspects of the transceiver 1020 described with reference to FIG. 10. The receiver 810 may utilize a single antenna or a set of antennas.

The communications manager 815 may be an example of aspects of the communications manager 715 as described herein. The communications manager 815 may include a joint control receiver 820, a downlink timing component 825, an uplink timing component 830, and a message communicator 835. The communications manager 815 may be an example of aspects of the communications manager 1010 described herein.

The joint control receiver 820 may receive, from a base station, a control message that includes scheduling information for a downlink message to be received by the UE and an uplink message to be transmitted by the UE, the scheduling information allocating first resources for the downlink message and second resources for the uplink message. In some examples, the first resources may at least partially overlap the second resources in at least one of time or frequency.

The downlink timing component 825 may determine timing information for the downlink message based on the scheduling information.

The uplink timing component 830 may determine timing information for the uplink message based on the timing information for the downlink message and the scheduling information.

The message communicator 835 may receive the downlink message using the first resources according to timing information for the downlink message that is determined based on the scheduling information, and transmit the uplink message using the second resources according to timing information for the uplink message that is determined based on the timing information for the downlink message and the scheduling information.

The transmitter 840 may transmit signals generated by other components of the device 805. In some examples, the transmitter 840 may be collocated with a receiver 810 in a transceiver module. For example, the transmitter 840 may be an example of aspects of the transceiver 1020 described with reference to FIG. 10. The transmitter 840 may utilize a single antenna or a set of antennas.

The receiver 810 may receive analog or digital radio frequency (RF) signals 801 via an antenna or set of antennas, and may pass the signaling 811 to the joint control receiver 820. The signaling 811 may include one or more sets of bits of a control message, such as a joint DCI, that scheduled both uplink and downlink messages for the device 805. The joint control receiver 820 may send timing information 812 to the downlink timing component and the uplink timing component 830. The timing information 812 may include bits corresponding to one or more bit fields of the control message that indicates timing information for uplink or downlink messages for the device 805.

The downlink timing component 825 may send downlink timing information 826 such as starting symbol, SLIV, or other timing parameters corresponding to a downlink message for the device 805 to the message communicator 835. The uplink timing component 830 may send uplink timing information 831 such as starting symbol, SLIV, or other timing parameters corresponding to an uplink message for the device 805 to the message communicator 835. The message communicator 835 may prepare an uplink message or other uplink information 836 for sending to the transmitter 840, which may transmit an uplink message 841. The message communicator 835 may send downlink message information 837 to the receiver 810, and the receiver 810 receive the downlink message 828 based on the downlink message information 837.

Figure 9:
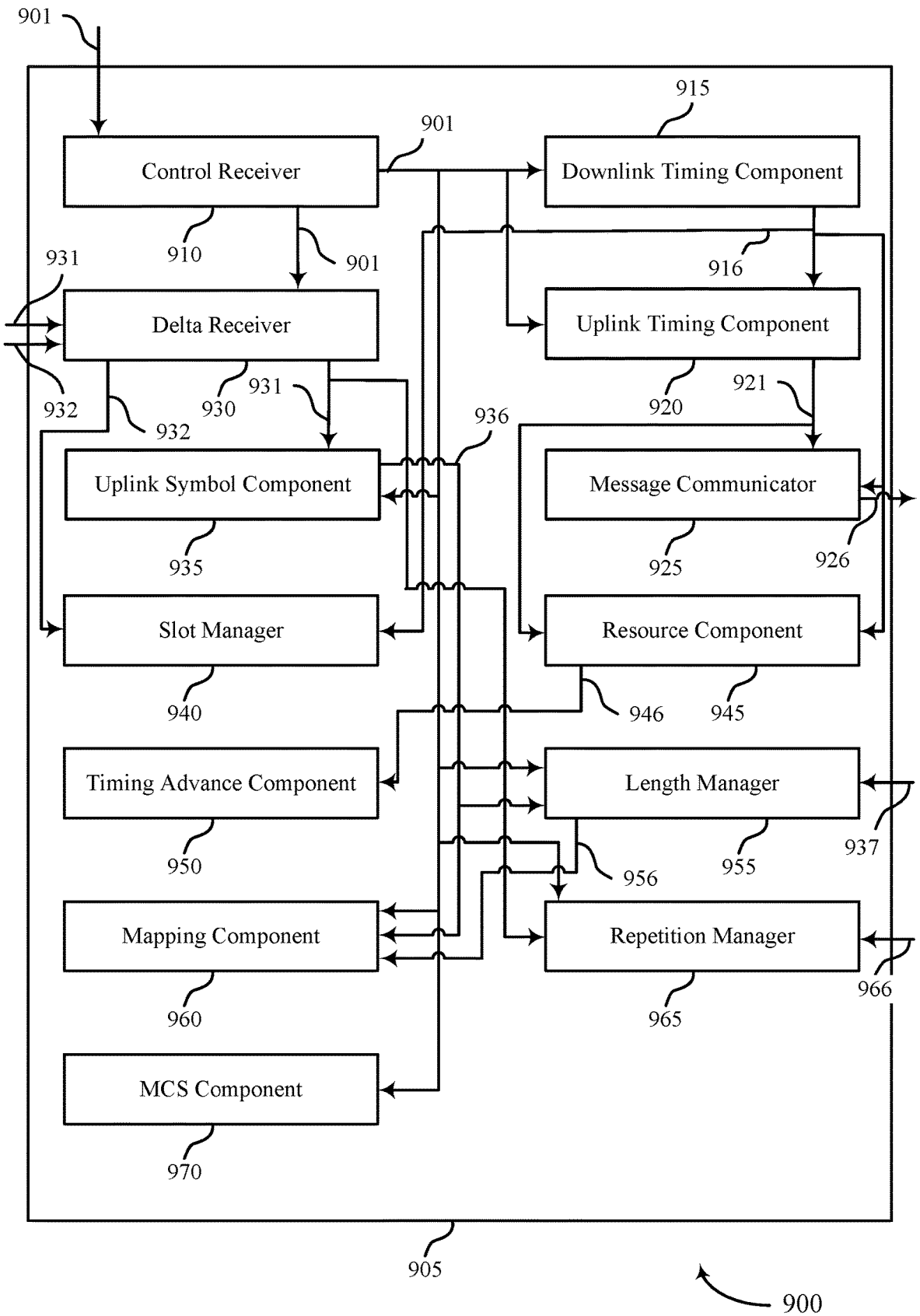
FIG. 9 shows a block diagram of a communications manager that supports joint shared channel allocation in DCI in accordance with aspects of the present disclosure.

FIG. 9 shows a block diagram 900 of a communications manager 905 that supports joint shared channel allocation in DCI in accordance with aspects of the present disclosure. The communications manager 905 may be an example of aspects of a communications manager 715, a communications manager 815, or a communications manager 1010 described herein. The communications manager 905 may include a control receiver 910, a downlink timing component 915, an uplink timing component 920, a message communicator 925, a delta receiver 930, an uplink symbol component 935, a slot manager 940, a resource component 945, a timing advance component 950, a length manager 955, a mapping component 960, a repetition manager 965, and an MCS component 970. Each of these modules may communicate, directly or indirectly, with one another (e.g., via one or more buses).

The control receiver 910 may receive, from a base station, a control message 901 that includes scheduling information for a downlink message to be received by a UE and an uplink message to be transmitted by the UE, the scheduling information allocating first resources for the downlink message and second resources for the uplink message. In some examples, the first resources may at least partially overlap the second resources in at least one of time or frequency. In some examples, the control receiver 910 may receive the control message 901 via a carrier different from the carrier used for the uplink and downlink messages. The control receiver 910 may send the control message 901 to one or more of the downlink timing component 915, the uplink timing component 920, or the MCS component 970.

The downlink timing component 915 may determine downlink timing information 916 for a downlink message based on a field of the control message 901. In some examples, the downlink timing component 915 may determine a starting symbol, a length value, a slot offset, a mapping type, or any combination thereof for the downlink message based on a TDRA field of the control message.

The uplink timing component 920 may determine uplink timing information 921 for an uplink message based on the downlink timing information 916 and the control message 901. In some examples, the uplink timing component 920 may receive the control message 901, the timing information for the downlink message 916, or both.

The message communicator 925 may communicate the uplink and downlink messages 926 (e.g., with the base station) according to the downlink timing information 916 and the uplink timing information 921. In some examples, the message communicator 925 may receive the downlink timing information 916 from the downlink timing component 915, the uplink timing information 921 from the uplink timing component 920, or both. In some examples, the message communicator 925 may transmit the uplink message in accordance with a set of time resources and the applied timing advance. In some cases, the message communicator 925 may transmit the uplink message via the set of time resources. In some instances, the message communicator 925 may transmit the uplink message in accordance with the determined symbol length. In some aspects, the message communicator 925 may communicate the uplink and downlink messages with the base station via a same carrier based on the scheduling information.

The delta receiver 930 may receive a message from the base station indicating a delta symbol value 931 associated with the uplink message, where the message is received via RRC signaling, a MAC-CE, or DCI. In some examples, the delta receiver 930 may select the delta symbol value from the set of delta symbol values based on the scheduling information (e.g., included in the control message 901). In some examples, the delta receiver 930 may receive the join control message 901. In some cases, the delta receiver 930 may receive a message from the base station indicating a delta slot value 932 associated with the timing information for the uplink message, where the message is received via RRC signaling, a MAC-CE, or DCI.

The uplink symbol component 935 may determine a starting symbol 936 for the uplink message based on a starting symbol of the downlink message (e.g., included in the timing information for the downlink timing information 916) and the delta symbol value 931. In some examples, the uplink symbol component 935 may determine a starting symbol 936 for the uplink message based on the delta symbol value 931 and a symbol during a monitoring occasion in which the control message 901 is received. In some examples, the uplink symbol component 935 may receive the delta symbol value 931, the control message 901, or both.

The slot manager 940 may determine a slot for transmission of the uplink message based on a starting symbol for the downlink message (e.g., included in the timing information for the downlink message 916), the delta slot value 932, and a ratio that is based on a first subcarrier spacing for the uplink message and a second subcarrier spacing for the downlink message. In some examples, the slot manager 940 may receive the timing information for the downlink message 916, the delta slot value 932, or both. In some examples, the slot manager 940 may determine a slot for transmission of the uplink message based on a slot scheduled for the downlink message and the delta slot value 932.

The resource component 945 may determine a set of time resources 946 for transmission of the uplink message based on the timing information for the downlink message 916. In some examples, the resource component 945 may determine a set of time resources for transmission of the uplink message that are aligned with a set of downlink symbols (e.g., downlink slots) based on the downlink timing information 916 or the uplink timing information 921. In some examples, the resource component 945 may receive the downlink timing information 916, the uplink timing information 921, or both.

The timing advance component 950 may apply a timing advance of the UE for transmitting the uplink message based on the set of time resources 946. In some examples, the timing advance component 950 may receive the set of time resources 946.

The length manager 955 may determine a symbol length for transmission of the uplink message 956 based on a start symbol 936. In some examples, the length manager 955 may receive a message from the base station including a length indicator 937 for transmission of the uplink message, where the message is received via RRC signaling, a MAC-CE, or DCI. In some cases, the length manager 955 may determine a symbol length for the uplink message based on the length indicator. In some cases, the length indicator 937 may include a set of symbol lengths. In some instances, the length manager 955 may select the symbol length from the set of symbol lengths based on the scheduling information (e.g., included in the control message 901). In some examples, the length manager 955 may receive the start symbol of the uplink symbol 936, the control message 901, or both.

The mapping component 960 may determine a reference signal mapping type for the uplink message based on a portion of the scheduling information of the control message 901. In some examples, the mapping component 960 may determine that the reference signal mapping type is Type-A mapping based on a starting symbol 936 and a symbol length 956 of the uplink message. In some examples, the mapping component 960 may receive the control message 901, the starting symbol 936, the symbol length 956, or a combination.

The repetition manager 965 may determine a repetition index based on the scheduling information (e.g., included in the control message 901). In some examples, the repetition manager 965 may determine a number of repetitions for the uplink message based on the repetition index. In some cases, the repetition manager 965 may determine a number of repetitions for the downlink message based on the scheduling information. In some aspects, the repetition manager 965 may determine the number of repetitions for the uplink message based on the number of repetitions of the downlink message. In some instances, the repetition manager 965 may determine the number of repetitions for the uplink message based on the number of repetitions for the downlink message and a delta value 931. In some examples, the repetition manager 965 may receive a message from the base station including the repetition index 966, where the message is received via RRC signaling. In some examples, the repetition manager 965 may receive the control message 901, the delta value 931, or both.

The MCS component 970 may determine a first MCS for the downlink message based on the control message 901. In some examples, the MCS component 970 may receive the control message 901. In some examples, the MCS component 970 may determine a second MCS for the uplink message based on the first MCS for the downlink message.

Figure 10:
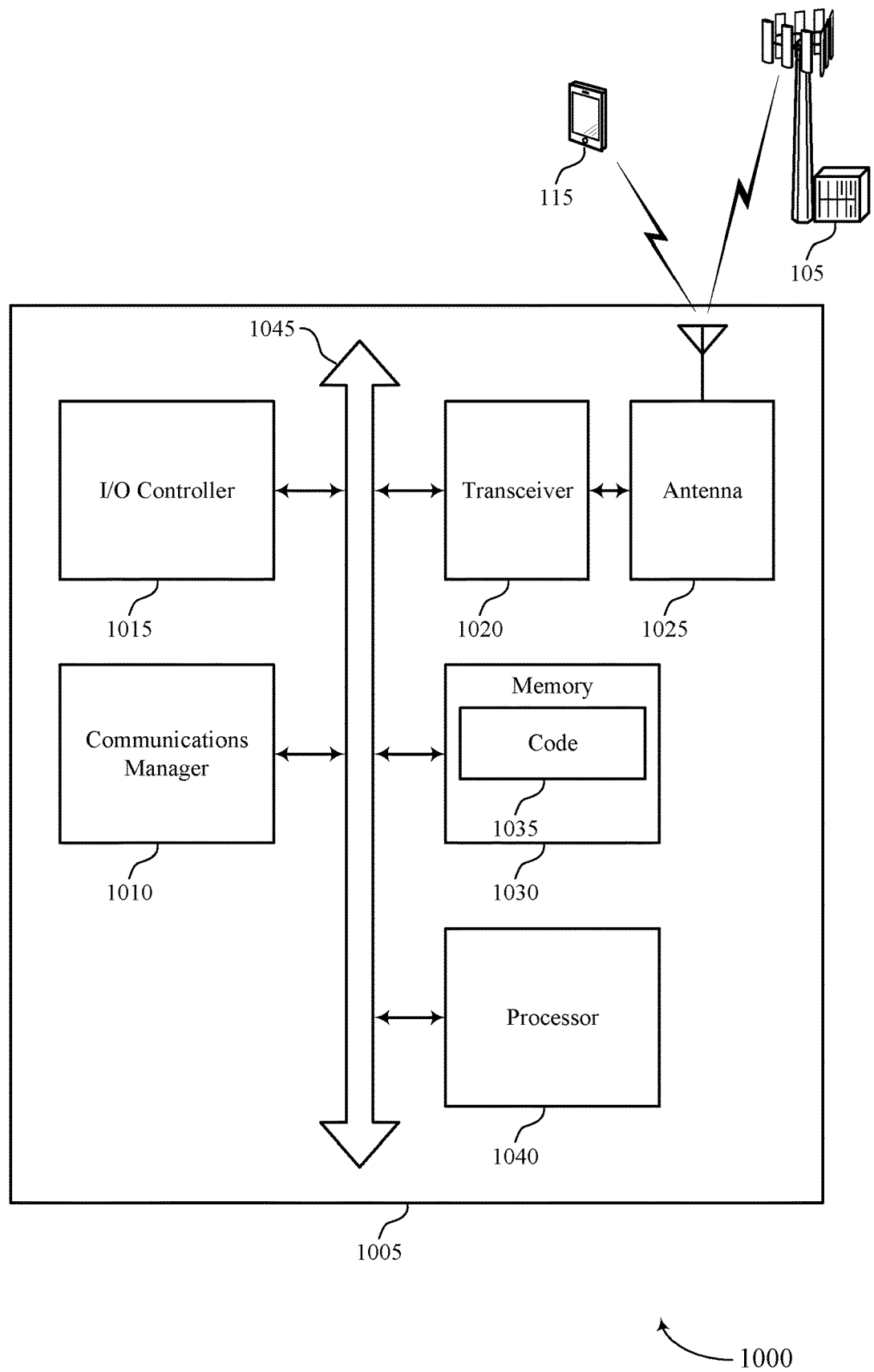
FIG. 10 shows a diagram of a system including a device that supports joint shared channel allocation in DCI in accordance with aspects of the present disclosure.

FIG. 10 shows a diagram of a system 1000 including a device 1005 that supports joint shared channel allocation in DCI in accordance with aspects of the present disclosure. The device 1005 may be an example of or include the components of device 705, device 805, or a UE 115 as described herein. The device 1005 may include components for bi-directional voice and data communications including components for transmitting and receiving communications, including a communications manager 1010, an I/O controller 1015, a transceiver 1020, an antenna 1025, memory 1030, and a processor 1040. These components may be in electronic communication via one or more buses (e.g., bus 1045).

The communications manager 1010 may receive, from a base station, a control message (e.g., a joint control message) that includes scheduling information for a downlink message to be received by the UE and an uplink message to be transmitted by the UE, the scheduling information allocating first resources for the downlink message and second resources for the uplink message, determine timing information for the downlink message that is determined based on the scheduling information, determine timing information for the uplink message based on the timing information for the downlink message and the scheduling information, receive the downlink message using the first resources according to timing information for the downlink message that is determined based on the scheduling information, and transmit the uplink message using the second resources according to timing information for the uplink message that is determined based on the timing information for the downlink message and the scheduling information. In some examples, the first resources may at least partially overlap the second resources in at least one of time or frequency.

The I/O controller 1015 may manage input and output signals for the device 1005. The I/O controller 1015 may also manage peripherals not integrated into the device 1005. In some cases, the I/O controller 1015 may represent a physical connection or port to an external peripheral. In some cases, the I/O controller 1015 may utilize an operating system such as iOS®, ANDROID®, MS-DOS®, MS-WINDOWS®, OS/2®, UNIX®, LINUX®, or another known operating system. In other cases, the I/O controller 1015 may represent or interact with a modem, a keyboard, a mouse, a touchscreen, or a similar device. In some cases, the I/O controller 1015 may be implemented as part of a processor. In some cases, a user may interact with the device 1005 via the I/O controller 1015 or via hardware components controlled by the I/O controller 1015.

The transceiver 1020 may communicate bi-directionally, via one or more antennas, wired, or wireless links as described herein. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

In some cases, the wireless device may include a single antenna 1025. However, in some cases the device may have more than one antenna 1025, which may be capable of concurrently transmitting or receiving multiple wireless transmissions.

The memory 1030 may include random access memory (RAM) and read only memory (ROM). The memory 1030 may store computer-readable, computer-executable code 1035 including instructions that, when executed, cause the processor to perform various functions described herein. In some cases, the memory 1030 may contain, among other things, a basic I/O system (BIOS) which may control basic hardware or software operation such as the interaction with peripheral components or devices.

The processor 1040 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting joint shared channel allocation in DCI).

The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

By including or configuring the communications manager 1010 in accordance with examples as described herein, the device 1005 may support techniques for improved communication reliability, reduced latency, improved user experience related to reduced processing, reduced power consumption, more efficient utilization of communication resources, improved coordination between devices, longer battery life, improved utilization of processing capability.

Figure 11:
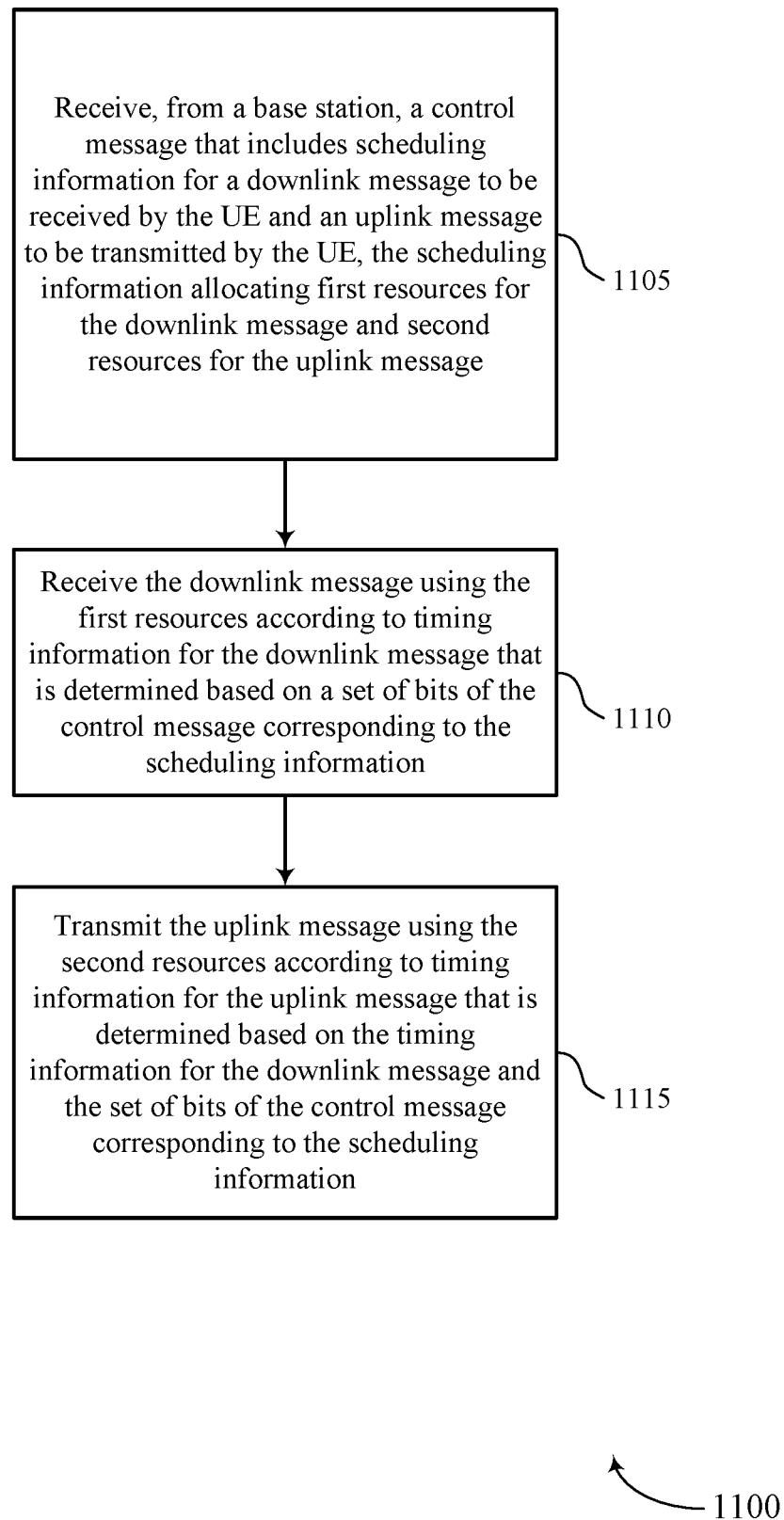
FIGS. 11 through 18 show flowcharts illustrating methods that support joint shared channel allocation in DCI in accordance with aspects of the present disclosure.

FIG. 11 shows a flowchart illustrating a method 1100 that supports joint shared channel allocation in DCI in accordance with aspects of the present disclosure. The operations of method 1100 may be implemented by a UE 115 or a base station 105 or components of the UE 115 or base station 105 as described herein. For example, the operations of method 1100 may be performed by a communications manager as described with reference to FIGS. 7 through 10. In some examples, a UE may execute a set of instructions to control the functional elements of the UE to perform the functions described herein. Additionally, or alternatively, a UE may perform aspects of the functions described herein using special-purpose hardware.

At 1105, the UE may receive, from a base station, a control message (e.g., a joint control message) that includes scheduling information for a downlink message to be received by the UE and an uplink message to be transmitted by the UE, the scheduling information allocating first resources for the downlink message and second resources for the uplink message. In some examples, the first resources may at least partially overlap the second resources in at least one of time or frequency.

In some examples, the base station may transmit, to the UE, the control message that includes the scheduling information for the downlink message to be transmitted by the base station and the uplink message to be received by the base station, the scheduling information allocating the first resources for the downlink message that at least partially overlap the second resources for the uplink message in at least one of time or frequency.

The operations of 1105 may be performed according to the methods described herein. In some examples, aspects of the operations of 1105 may be performed by a joint control receiver as described with reference to FIGS. 7 through 10.

At 1110, the UE may determine timing information for the downlink message based on the scheduling information. The operations of 1110 may be performed according to the methods described herein. In some examples, aspects of the operations of 1110 may be performed by a downlink timing component as described with reference to FIGS. 7 through 10.

At 1115, the UE may determine timing information for the uplink message based on the timing information for the downlink message and the scheduling information. The operations of 1115 may be performed according to the methods described herein. In some examples, aspects of the operations of 1115 may be performed by an uplink timing component as described with reference to FIGS. 7 through 10.

At 1110, the UE may receive the downlink message using the first resources according to timing information for the downlink message that is determined based on the scheduling information. The operations of 1120 may be performed according to the methods described herein. In some examples, aspects of the operations of 1110 may be performed by a message communicator as described with reference to FIGS. 7 through 10.

At 1115, the UE may transmit the uplink message using the second resources according to timing information for the uplink message that is determined based on the timing information for the downlink message and the scheduling information. The operations of 1120 may be performed according to the methods described herein. In some examples, aspects of the operations of 1120 may be performed by a message communicator as described with reference to FIGS. 7 through 10.

The operations of 1115 may be performed according to the methods described herein. In some examples, aspects of the operations of 1115 may be performed by a message communicator as described with reference to FIGS. 7 through 10.

Figure 12:
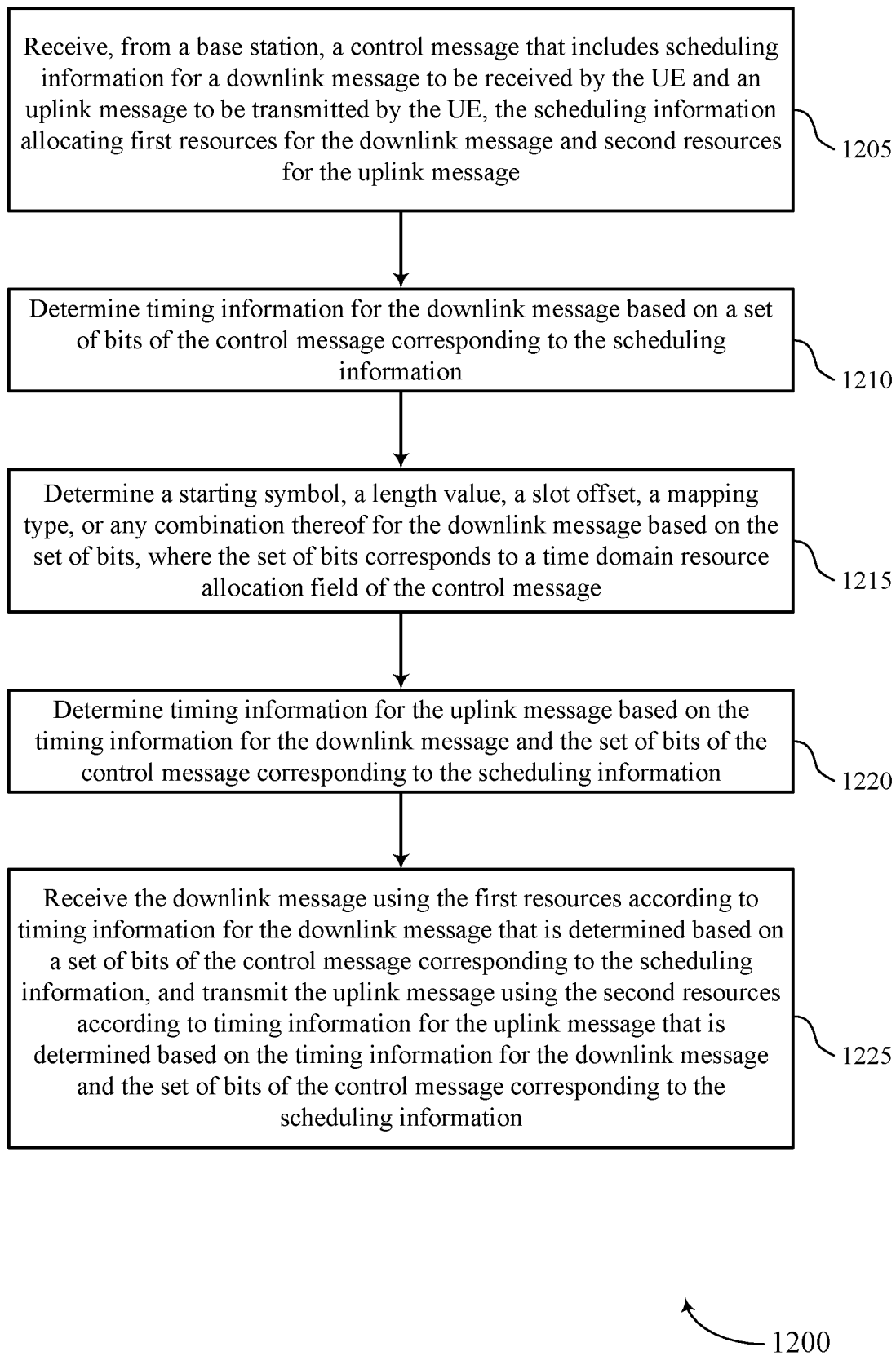

FIG. 12 shows a flowchart illustrating a method 1200 that supports joint shared channel allocation in DCI in accordance with aspects of the present disclosure. The operations of method 1200 may be implemented by a UE 115 or a base station 105 or components of the UE 115 or base station 105 as described herein. For example, the operations of method 1200 may be performed by a communications manager as described with reference to FIGS. 7 through 10. In some examples, a UE may execute a set of instructions to control the functional elements of the UE to perform the functions described herein. Additionally, or alternatively, a UE may perform aspects of the functions described herein using special-purpose hardware.

At 1205, the UE may receive, from a base station, a control message (e.g., a joint control message) that includes scheduling information for a downlink message to be received by the UE and an uplink message to be transmitted by the UE, the scheduling information allocating first resources for the downlink message and second resources for the uplink message. In some examples, the first resources may at least partially overlap the second resources in at least one of time or frequency.

In some examples, the base station may transmit, to the UE, the joint control message that includes the scheduling information for the downlink message to be transmitted by the base station and the uplink message to be received by the base station, the scheduling information allocating the first resources for the downlink message that at least partially overlap the second resources for the uplink message in at least one of time or frequency.

The operations of 1205 may be performed according to the methods described herein. In some examples, aspects of the operations of 1205 may be performed by a joint control receiver as described with reference to FIGS. 7 through 10.

At 1210, the UE may determine timing information for the downlink message based on the scheduling information. The operations of 1210 may be performed according to the methods described herein. In some examples, aspects of the operations of 1210 may be performed by a downlink timing component as described with reference to FIGS. 7 through 10.

At 1215, the UE may determine a starting symbol, a length value, a slot offset, a mapping type, or any combination thereof for the downlink message based on a TDRA field of the control message. The operations of 1215 may be performed according to the methods described herein. In some examples, aspects of the operations of 1215 may be performed by a downlink timing component as described with reference to FIGS. 7 through 10.

At 1220, the UE may determine timing information for the uplink message based on the timing information for the downlink message and the scheduling information. The operations of 1220 may be performed according to the methods described herein. In some examples, aspects of the operations of 1220 may be performed by an uplink timing component as described with reference to FIGS. 7 through 10.

At 1225, the UE may receive the downlink message using the first resources according to timing information for the downlink message that is determined based on the scheduling information, and transmit the uplink message using the second resources according to timing information for the uplink message that is determined based on the timing information for the downlink message and the scheduling information. The operations of 1225 may be performed according to the methods described herein. In some examples, aspects of the operations of 1225 may be performed by a message communicator as described with reference to FIGS. 7 through 10.

Figure 13:
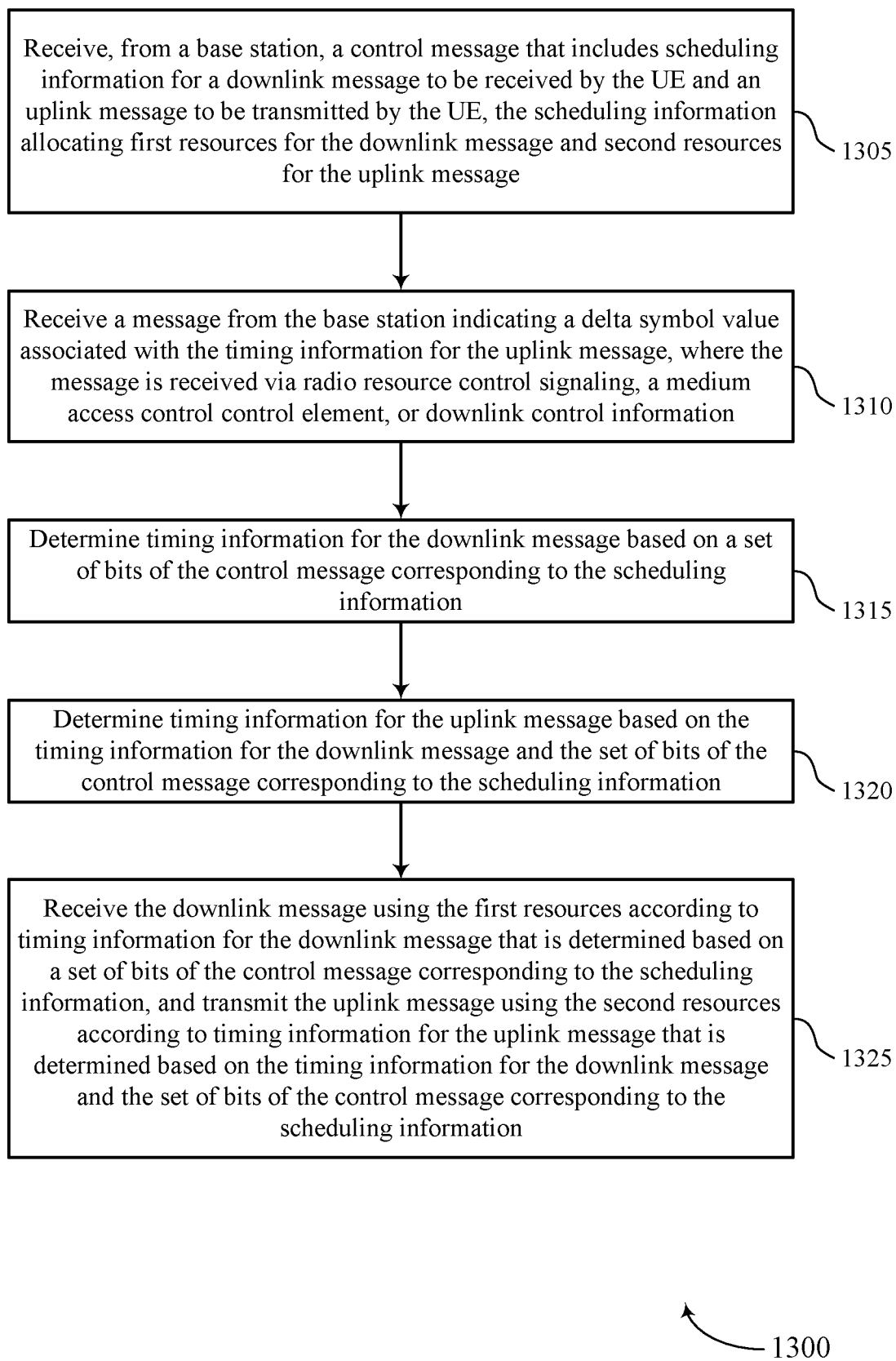

FIG. 13 shows a flowchart illustrating a method 1300 that supports joint shared channel allocation in DCI in accordance with aspects of the present disclosure. The operations of method 1300 may be implemented by a UE 115 or a base station 105 or components of the UE 115 or base station 105 as described herein. For example, the operations of method 1300 may be performed by a communications manager as described with reference to FIGS. 7 through 10. In some examples, a UE may execute a set of instructions to control the functional elements of the UE to perform the functions described herein. Additionally, or alternatively, a UE may perform aspects of the functions described herein using special-purpose hardware.

At 1305, the UE may receive, from a base station, a control message (e.g., a joint control message) that includes scheduling information for a downlink message to be received by the UE and an uplink message to be transmitted by the UE, the scheduling information allocating first resources for the downlink message and second resources for the uplink message. In some examples, the first resources may at least partially overlap the second resources in at least one of time or frequency.

In some examples, the base station may transmit, to the UE, the control message that includes the scheduling information for the downlink message to be transmitted by the base station and the uplink message to be received by the base station, the scheduling information allocating the first resources for the downlink message that at least partially overlap the second resources for the uplink message in at least one of time or frequency.

The operations of 1305 may be performed according to the methods described herein. In some examples, aspects of the operations of 1305 may be performed by a joint control receiver as described with reference to FIGS. 7 through 10.

At 1310, the UE may receive a message from the base station indicating a delta symbol value associated with the timing information for the uplink message, where the message is received via RRC signaling, a MAC-CE, or DCI.

In some examples, the base station may transmit the message to the UE indicating the delta symbol value associated with the timing information for the uplink message, where the message is transmitted via the RRC signaling, the MAC-CE, or the DCI.

The operations of 1310 may be performed according to the methods described herein. In some examples, aspects of the operations of 1310 may be performed by a delta receiver as described with reference to FIGS. 7 through 10.

At 1315, the UE may determine timing information for the downlink message based on the scheduling information. The operations of 1315 may be performed according to the methods described herein. In some examples, aspects of the operations of 1315 may be performed by a downlink timing component as described with reference to FIGS. 7 through 10.

At 1320, the UE may determine timing information for the uplink message based on the timing information for the downlink message and the scheduling information. The operations of 1320 may be performed according to the methods described herein. In some examples, aspects of the operations of 1320 may be performed by an uplink timing component as described with reference to FIGS. 7 through 10.

At 1325, the UE may receive the downlink message using the first resources according to timing information for the downlink message that is determined based on the scheduling information, and transmit the uplink message using the second resources according to timing information for the uplink message that is determined based on the timing information for the downlink message and the scheduling information. The operations of 1325 may be performed according to the methods described herein. In some examples, aspects of the operations of 1325 may be performed by a message communicator as described with reference to FIGS. 7 through 10.

Figure 14:
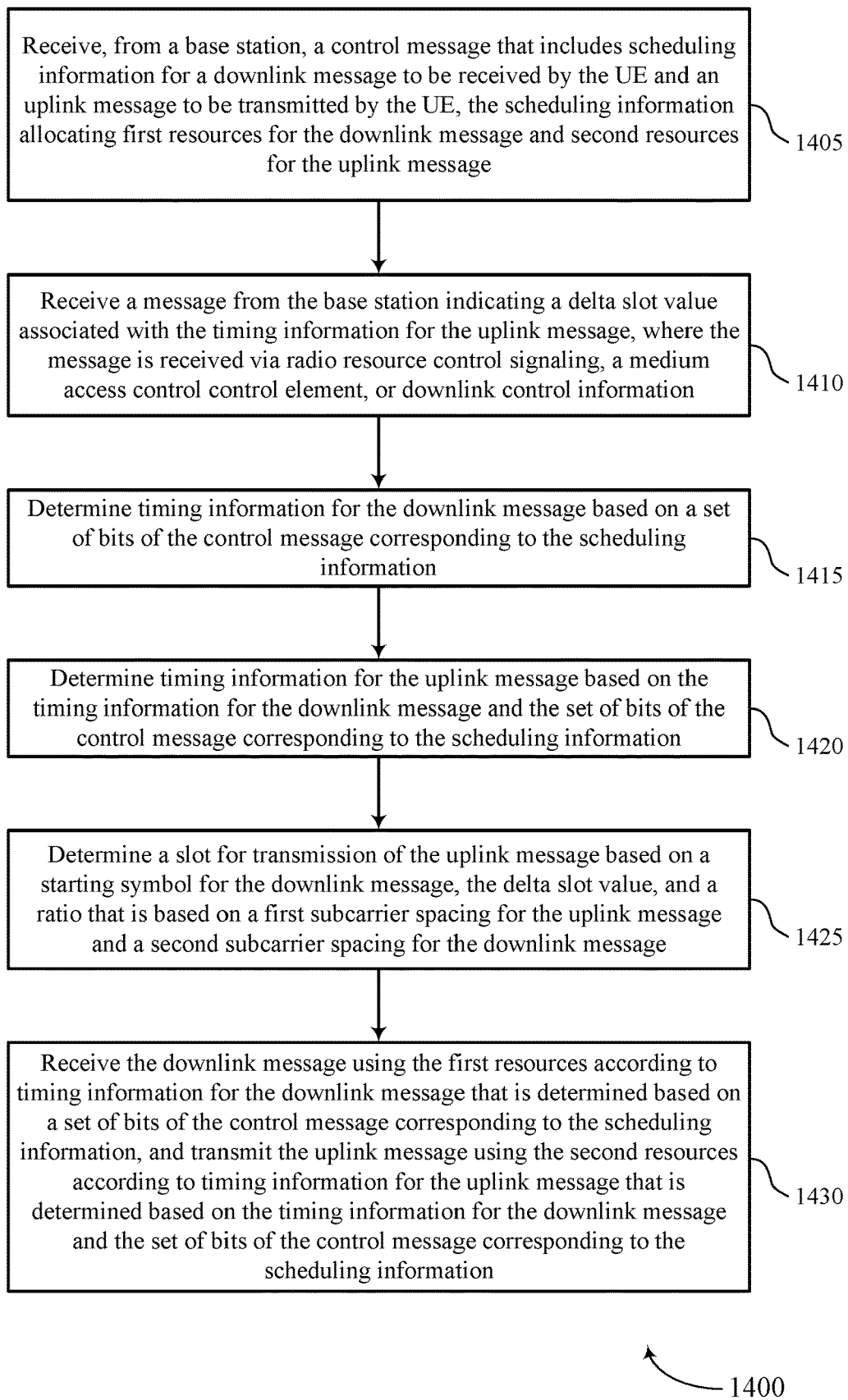

FIG. 14 shows a flowchart illustrating a method 1400 that supports joint shared channel allocation in DCI in accordance with aspects of the present disclosure. The operations of method 1400 may be implemented by a UE 115 or a base station 105 or components of the UE 115 or base station 105 as described herein. For example, the operations of method 1400 may be performed by a communications manager as described with reference to FIGS. 7 through 10. In some examples, a UE may execute a set of instructions to control the functional elements of the UE to perform the functions described herein. Additionally, or alternatively, a UE may perform aspects of the functions described herein using special-purpose hardware.

At 1405, the UE may receive, from a base station, a control message (e.g., a joint control message) that includes scheduling information for a downlink message to be received by the UE and an uplink message to be transmitted by the UE, the scheduling information allocating first resources for the downlink message and second resources for the uplink message. In some examples, the first resources may at least partially overlap the second resources in at least one of time or frequency.

In some examples, the base station may transmit, to the UE, the control message that includes the scheduling information for the downlink message to be transmitted by the base station and an uplink message to be received by the base station, the scheduling information allocating the first resources for the downlink message that at least partially overlap the second resources for the uplink message in at least one of time or frequency.

The operations of 1405 may be performed according to the methods described herein. In some examples, aspects of the operations of 1405 may be performed by a joint control receiver as described with reference to FIGS. 7 through 10.

At 1410, the UE may receive a message from the base station indicating a delta slot value associated with the timing information for the uplink message, where the message is received via RRC signaling, a MAC-CE, or DCI.

In some examples, the base station may transmit the message to the UE indicating the delta slot value associated with the timing information for the uplink message, where the message is transmitted via the RRC signaling, the MAC-CE, or the DCI.

The operations of 1410 may be performed according to the methods described herein. In some examples, aspects of the operations of 1410 may be performed by a delta receiver as described with reference to FIGS. 7 through 10.

At 1415, the UE may determine timing information for the downlink message based on the scheduling information. The operations of 1415 may be performed according to the methods described herein. In some examples, aspects of the operations of 1415 may be performed by a downlink timing component as described with reference to FIGS. 7 through 10.

At 1420, the UE may determine timing information for the uplink message based on the timing information for the downlink message and the scheduling information. The operations of 1420 may be performed according to the methods described herein. In some examples, aspects of the operations of 1420 may be performed by an uplink timing component as described with reference to FIGS. 7 through 10.

At 1425, the UE may determine a slot for transmission of the uplink message based on a starting symbol for the downlink message, the delta slot value, and a ratio that is based on a first subcarrier spacing for the uplink message and a second subcarrier spacing for the downlink message. The operations of 1425 may be performed according to the methods described herein. In some examples, aspects of the operations of 1425 may be performed by a slot manager as described with reference to FIGS. 7 through 10.

At 1430, the UE may receive the downlink message using the first resources according to timing information for the downlink message that is determined based on the scheduling information, and transmit the uplink message using the second resources according to timing information for the uplink message that is determined based on the timing information for the downlink message and the scheduling information. The operations of 1430 may be performed according to the methods described herein. In some examples, aspects of the operations of 1430 may be performed by a message communicator as described with reference to FIGS. 7 through 10.

Figure 15:
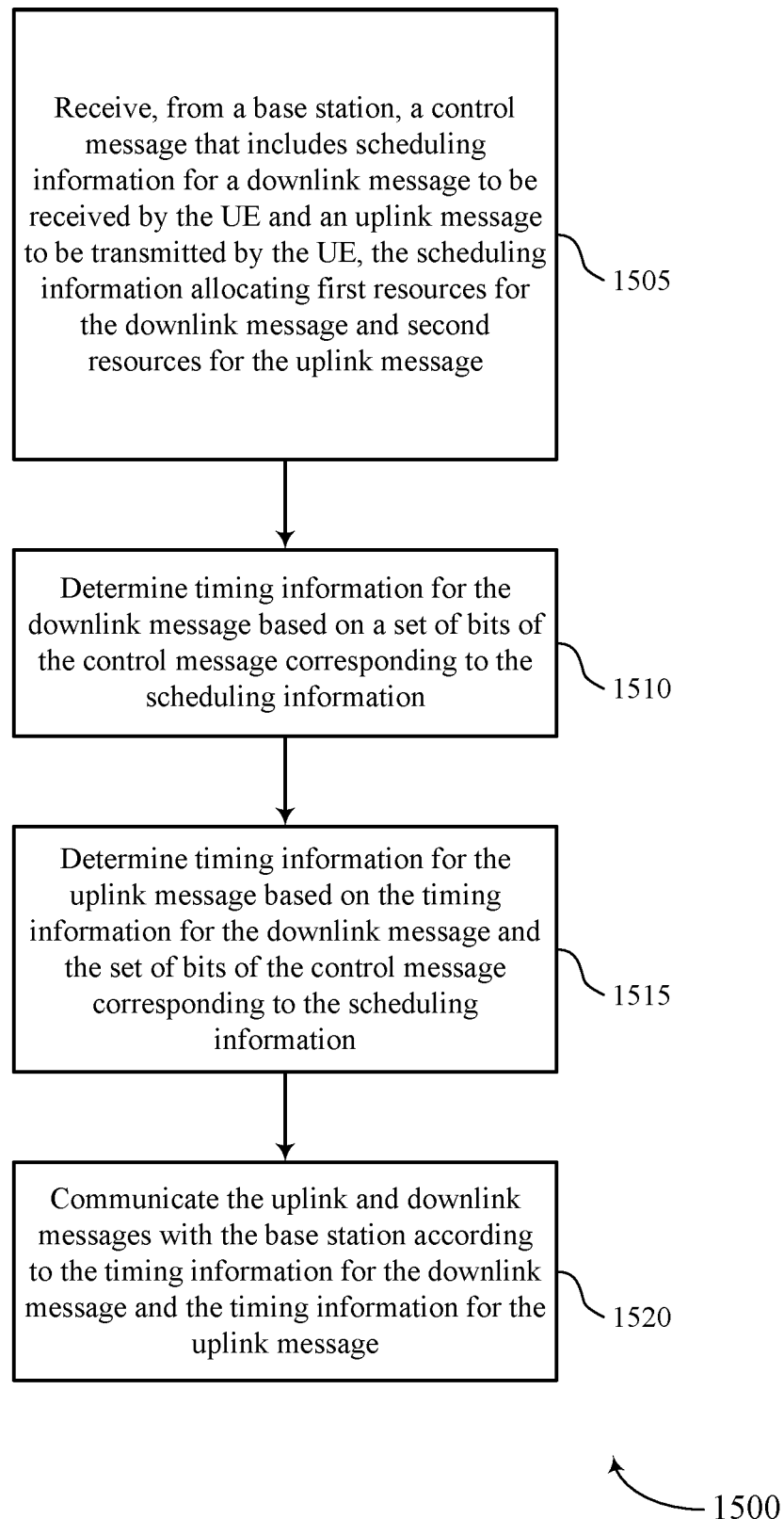

FIG. 15 shows a flowchart illustrating a method 1500 that supports joint shared channel allocation in DCI in accordance with aspects of the present disclosure. The operations of method 1500 may be implemented by a UE 115 or a base station 105 or components of the UE 115 or base station 105 as described herein. For example, the operations of method 1500 may be performed by a communications manager as described with reference to FIGS. 7 through 10. In some examples, a UE may execute a set of instructions to control the functional elements of the UE to perform the functions described herein. Additionally, or alternatively, a UE may perform aspects of the functions described herein using special-purpose hardware.

At 1505, the UE may receive, from a base station, a control message (e.g., a joint control message) that includes scheduling information for a downlink message to be received by the UE and an uplink message to be transmitted by the UE, the scheduling information allocating first resources for the downlink message and second resources for the uplink message. In some examples, the first resources may at least partially overlap the second resources in at least one of time or frequency.

In some examples, the base station may transmit, to the UE, the control message that includes the scheduling information for the downlink message to be transmitted by the base station and an uplink message to be received by the base station, the scheduling information allocating the first resources for the downlink message that at least partially overlap the second resources for the uplink message in at least one of time or frequency.

The operations of 1505 may be performed according to the methods described herein. In some examples, aspects of the operations of 1505 may be performed by a joint control receiver as described with reference to FIGS. 7 through 10.

At 1510, the UE may determine timing information for the downlink message based on the scheduling information. The operations of 1510 may be performed according to the methods described herein. In some examples, aspects of the operations of 1510 may be performed by a downlink timing component as described with reference to FIGS. 7 through 10.

At 1515, the UE may determine timing information for the uplink message based on the timing information for the downlink message and the scheduling information. The operations of 1515 may be performed according to the methods described herein. In some examples, aspects of the operations of 1515 may be performed by an uplink timing component as described with reference to FIGS. 7 through 10.

At 1520, the UE may communicate, with the base station, the uplink message according to the timing information for the uplink message and the downlink message according to the timing information for the downlink message.

In some examples, the base station may communicate the uplink and downlink messages with the UE according to the timing information for the downlink message and the timing information for the uplink message.

The operations of 1520 may be performed according to the methods described herein. In some examples, aspects of the operations of 1520 may be performed by a message communicator as described with reference to FIGS. 7 through 10.

Figure 16:
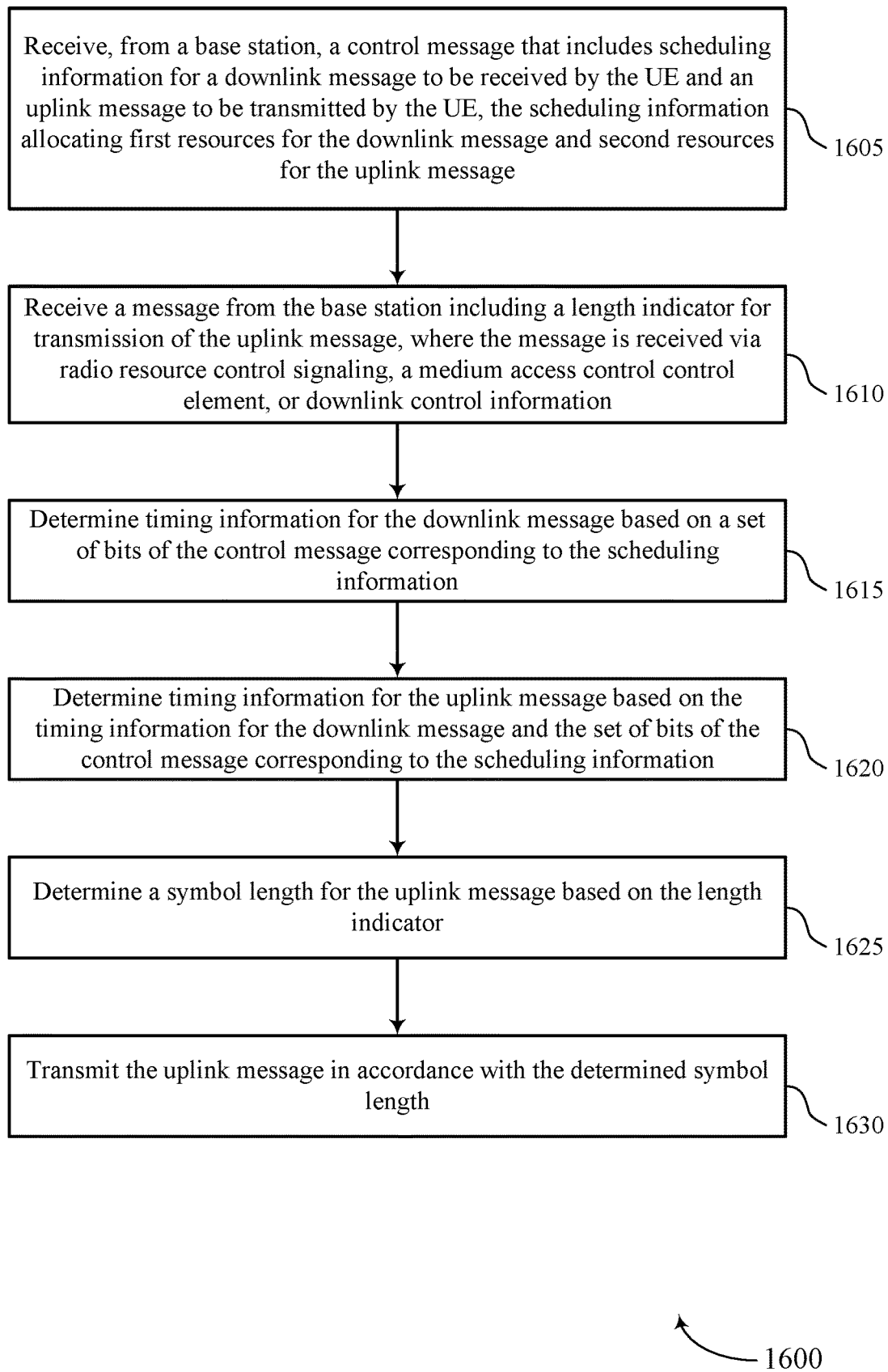

FIG. 16 shows a flowchart illustrating a method 1600 that supports joint shared channel allocation in DCI in accordance with aspects of the present disclosure. The operations of method 1600 may be implemented by a UE 115 or a base station 105 or components of the UE 115 or base station 105 as described herein. For example, the operations of method 1600 may be performed by a communications manager as described with reference to FIGS. 7 through 10. In some examples, a UE may execute a set of instructions to control the functional elements of the UE to perform the functions described herein. Additionally, or alternatively, a UE may perform aspects of the functions described herein using special-purpose hardware.

At 1605, the UE may receive, from a base station, a control message (e.g., a joint control message) that includes scheduling information for a downlink message to be received by the UE and an uplink message to be transmitted by the UE, the scheduling information allocating first resources for the downlink message and second resources for the uplink message. In some examples, the first resources may at least partially overlap the second resources in at least one of time or frequency.

In some examples, the base station may transmit, to the UE, the control message that includes the scheduling information for the downlink message to be transmitted by the base station and an uplink message to be received by the base station, the scheduling information allocating the first resources for the downlink message that at least partially overlap the second resources for the uplink message in at least one of time or frequency.

The operations of 1605 may be performed according to the methods described herein. In some examples, aspects of the operations of 1605 may be performed by a joint control receiver as described with reference to FIGS. 7 through 10.

At 1610, the UE may receive a message from the base station including a length indicator for transmission of the uplink message, where the message is received via RRC signaling, a MAC-CE, or DCI.

In some examples, the base station may transmit the message to the UE including the length indicator for receiving the uplink message, where the message is transmitted via the RRC signaling, the MAC-CE, or the DCI.

The operations of 1610 may be performed according to the methods described herein. In some examples, aspects of the operations of 1610 may be performed by a length manager as described with reference to FIGS. 7 through 10.

At 1615, the UE may determine timing information for the downlink message based on the scheduling information. The operations of 1615 may be performed according to the methods described herein. In some examples, aspects of the operations of 1615 may be performed by a downlink timing component as described with reference to FIGS. 7 through 10.

At 1620, the UE may determine timing information for the uplink message based on the timing information for the downlink message and the scheduling information. The operations of 1620 may be performed according to the methods described herein. In some examples, aspects of the operations of 1620 may be performed by an uplink timing component as described with reference to FIGS. 7 through 10.

At 1625, the UE may determine a symbol length for the uplink message based on the length indicator. The operations of 1625 may be performed according to the methods described herein. In some examples, aspects of the operations of 1625 may be performed by a length manager as described with reference to FIGS. 7 through 10.

At 1630, the UE may transmit the uplink message in accordance with the determined symbol length.

In some examples, the base station may receive the uplink message in accordance with the symbol length.

The operations of 1630 may be performed according to the methods described herein. In some examples, aspects of the operations of 1630 may be performed by a message communicator as described with reference to FIGS. 7 through 10.

Figure 17:
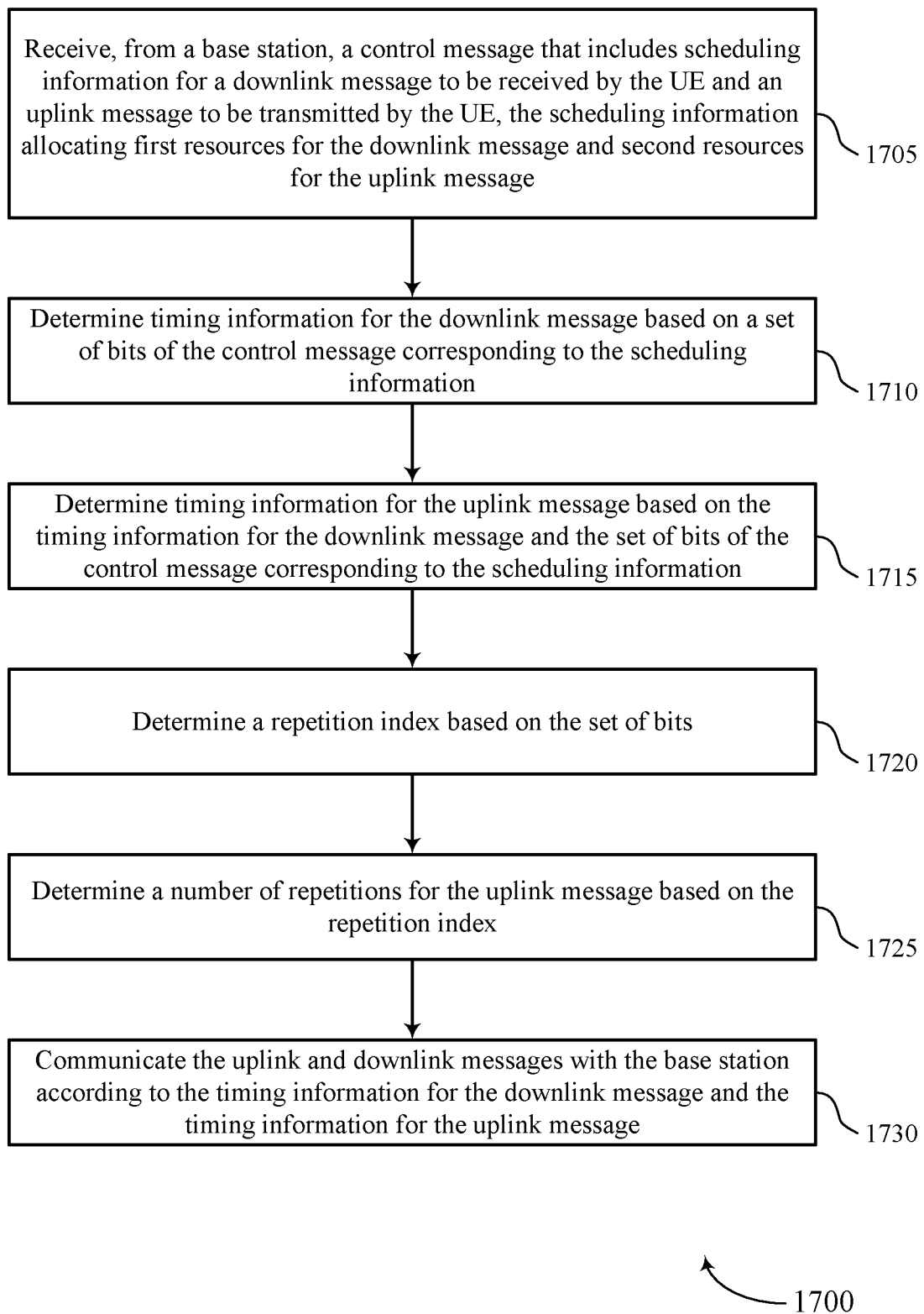

FIG. 17 shows a flowchart illustrating a method 1700 that supports joint shared channel allocation in DCI in accordance with aspects of the present disclosure. The operations of method 1700 may be implemented by a UE 115 or a base station 105 or components of the UE 115 or base station 105 as described herein. For example, the operations of method 1700 may be performed by a communications manager as described with reference to FIGS. 7 through 10. In some examples, a UE may execute a set of instructions to control the functional elements of the UE to perform the functions described herein. Additionally, or alternatively, a UE may perform aspects of the functions described herein using special-purpose hardware.

At 1705, the UE may receive, from a base station, a control message (e.g., a joint control message) that includes scheduling information for a downlink message to be received by the UE and an uplink message to be transmitted by the UE, the scheduling information allocating first resources for the downlink message and second resources for the uplink message. In some examples, the first resources may at least partially overlap the second resources in at least one of time or frequency.

In some examples, the base station may transmit, to the UE, the control message that includes the scheduling information for the downlink message to be transmitted by the base station and an uplink message to be received by the base station, the scheduling information allocating the first resources for the downlink message that at least partially overlap the second resources for the uplink message in at least one of time or frequency.

The operations of 1705 may be performed according to the methods described herein. In some examples, aspects of the operations of 1705 may be performed by a joint control receiver as described with reference to FIGS. 7 through 10.

At 1710, the UE may determine timing information for the downlink message based on the scheduling information. The operations of 1710 may be performed according to the methods described herein. In some examples, aspects of the operations of 1710 may be performed by a downlink timing component as described with reference to FIGS. 7 through 10.

At 1715, the UE may determine timing information for the uplink message based on the timing information for the downlink message and the scheduling information. The operations of 1715 may be performed according to the methods described herein. In some examples, aspects of the operations of 1715 may be performed by an uplink timing component as described with reference to FIGS. 7 through 10.

At 1720, the UE may determine a repetition index based on the scheduling information. The operations of 1720 may be performed according to the methods described herein. In some examples, aspects of the operations of 1720 may be performed by a repetition manager as described with reference to FIGS. 7 through 10.

At 1725, the UE may determine a number of repetitions for the uplink message based on the repetition index. The operations of 1725 may be performed according to the methods described herein. In some examples, aspects of the operations of 1725 may be performed by a repetition manager as described with reference to FIGS. 7 through 10.

At 1730, the UE may communicate, with the base station, the uplink message according to the timing information for the uplink message and the downlink message according to the timing information for the downlink message.

In some examples, the base station may communicate the uplink and downlink messages with the UE according to the timing information for the downlink message and the timing information for the uplink message.

The operations of 1730 may be performed according to the methods described herein. In some examples, aspects of the operations of 1730 may be performed by a message communicator as described with reference to FIGS. 7 through 10.

Figure 18:
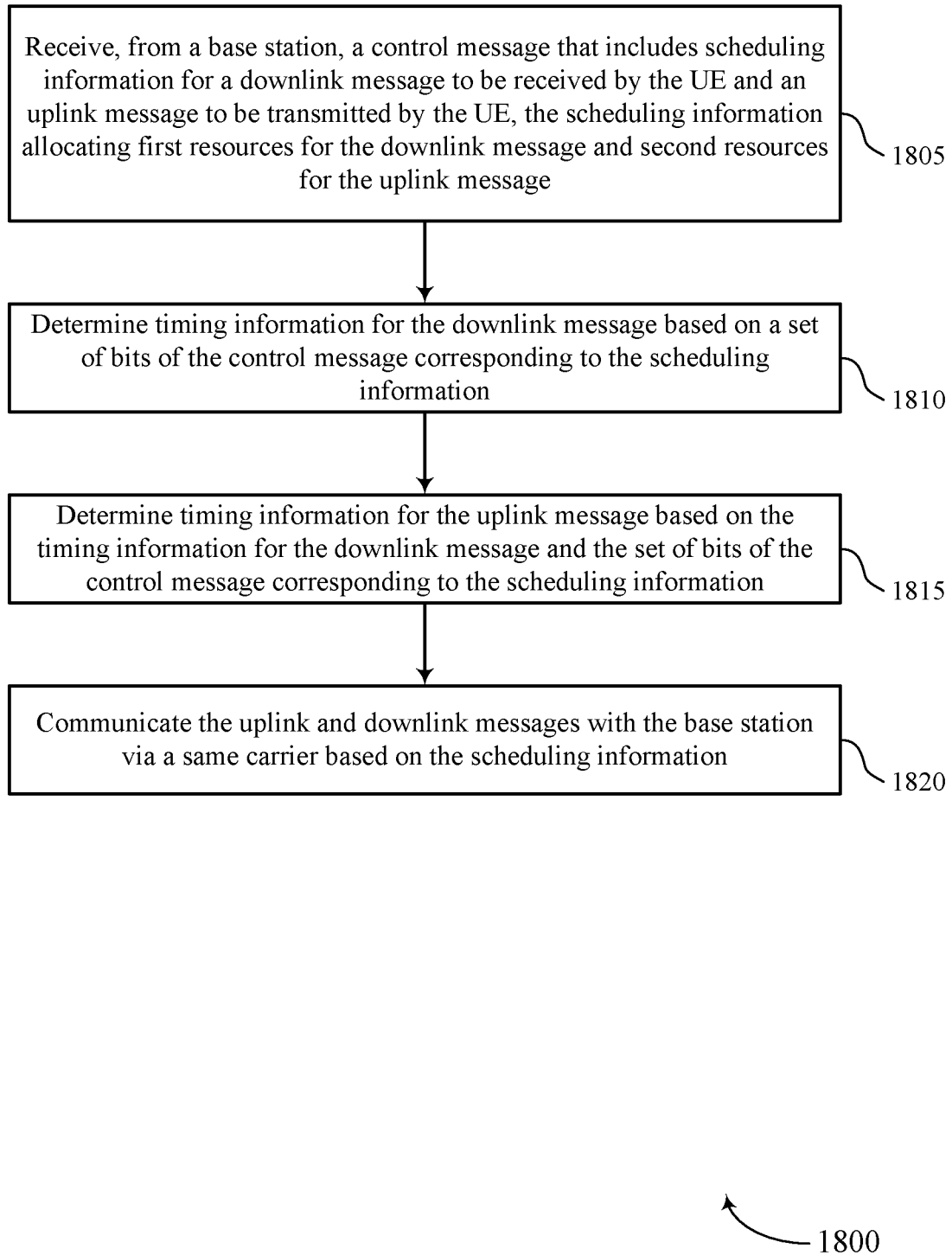

FIG. 18 shows a flowchart illustrating a method 1800 that supports joint shared channel allocation in DCI in accordance with aspects of the present disclosure. The operations of method 1800 may be implemented by a UE 115 or a base station 105 or components of the UE 115 or base station 105 as described herein. For example, the operations of method 1800 may be performed by a communications manager as described with reference to FIGS. 7 through 10. In some examples, a UE may execute a set of instructions to control the functional elements of the UE to perform the functions described herein. Additionally, or alternatively, a UE may perform aspects of the functions described herein using special-purpose hardware.

At 1805, the UE may receive, from a base station, a control message (e.g., a joint control message) that includes scheduling information for a downlink message to be received by the UE and an uplink message to be transmitted by the UE, the scheduling information allocating first resources for the downlink message and second resources for the uplink message. In some examples, the first resources may at least partially overlap the second resources in at least one of time or frequency.

In some examples, the base station may transmit, to the UE, the control message that includes the scheduling information for the downlink message to be transmitted by the base station and an uplink message to be received by the base station, the scheduling information allocating the first resources for the downlink message that at least partially overlap the second resources for the uplink message in at least one of time or frequency.

The operations of 1805 may be performed according to the methods described herein. In some examples, aspects of the operations of 1805 may be performed by a joint control receiver as described with reference to FIGS. 7 through 10.

At 1810, the UE may determine timing information for the downlink message based on the scheduling information. The operations of 1810 may be performed according to the methods described herein. In some examples, aspects of the operations of 1810 may be performed by a downlink timing component as described with reference to FIGS. 7 through 10.

At 1815, the UE may determine timing information for the uplink message based on the timing information for the downlink message and the scheduling information. The operations of 1815 may be performed according to the methods described herein. In some examples, aspects of the operations of 1815 may be performed by an uplink timing component as described with reference to FIGS. 7 through 10.

At 1820, the UE may communicate the uplink and downlink messages with the base station via a same carrier based on the scheduling information.

In some examples, the base station may communicate the uplink and downlink messages with the UE via the same carrier based on the scheduling information.

The operations of 1820 may be performed according to the methods described herein. In some examples, aspects of the operations of 1820 may be performed by a message communicator as described with reference to FIGS. 7 through 10.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communications at a UE, comprising: receiving, from a base station, a control message that comprises scheduling information for a downlink message to be received by the UE and an uplink message to be transmitted by the UE, the scheduling information allocating first resources for the downlink message and second resources for the uplink message; receiving the downlink message using the first resources according to timing information for the downlink message that is determined based at least in part on the scheduling information; and transmitting the uplink message using the second resources according to timing information for the uplink message that is determined based at least in part on the timing information for the downlink message and the scheduling information.

Aspect 2: The method of aspect 1, further comprising: determining a starting symbol, a length value, a slot offset, a mapping type, or any combination thereof for the downlink message based at least in part on a time domain resource allocation field of the control message.

Aspect 3: The method of any of aspects 1 through 2, further comprising: receiving a message from the base station indicating a delta symbol value associated with the timing information for the uplink message, wherein the message is received via RRC signaling, a MAC control element (MAC-CE), or DCI.

Aspect 4: The method of aspect 3, further comprising: determining a starting symbol for the uplink message based at least in part on a starting symbol of the downlink message and the delta symbol value.

Aspect 5: The method of any of aspects 3 through 4, further comprising: determining a starting symbol for the uplink message based at least in part on the delta symbol value and a symbol during a monitoring occasion in which the control message is received.

Aspect 6: The method of any of aspects 3 through 5, wherein the message comprises a set of delta symbol values, and wherein the method further comprises: selecting the delta symbol value from the set of delta symbol values based at least in part on the scheduling information.

Aspect 7: The method of any of aspects 1 through 6, further comprising: receiving a message from the base station indicating a delta slot value associated with the timing information for the uplink message, wherein the message is received via RRC signaling, a MAC-CE, or DCI.

Aspect 8: The method of aspect 7, further comprising: determining a slot for transmission of the uplink message based at least in part on a starting symbol for the downlink message, the delta slot value, and a ratio that is based at least in part on a first subcarrier spacing for the uplink message and a second subcarrier spacing for the downlink message.

Aspect 9: The method of any of aspects 7 through 8, further comprising: determining a slot for transmission of the uplink message based at least in part on a slot scheduled for the downlink message and the delta slot value.

Aspect 10: The method of any of aspects 1 through 9, further comprising: determining a set of time resources for transmission of the uplink message based at least in part on the timing information for the downlink message; applying a timing advance of the UE for transmitting the uplink message based at least in part on the set of time resources; and transmitting the uplink message in accordance with the set of time resources and the applied timing advance.

Aspect 11: The method of any of aspects 1 through 10, further comprising: determining a set of time resources for transmission of the uplink message that are aligned with a set of downlink symbols based at least in part on the timing information for the downlink message or the timing information for the uplink message; and transmitting the uplink message via the set of time resources.

Aspect 12: The method of any of aspects 1 through 11, further comprising: determining a symbol length for transmission of the uplink message based at least in part on a start symbol of the uplink message.

Aspect 13: The method of any of aspects 1 through 12, further comprising: receiving a message from the base station comprising a length indicator for transmission of the uplink message, wherein the message is received via RRC signaling, a MAC-CE, or DCI; determining a symbol length for the uplink message based at least in part on the length indicator; and transmitting the uplink message in accordance with the determined symbol length.

Aspect 14: The method of aspect 13, wherein the length indicator comprises a set of symbol lengths, and wherein determining the symbol length for the uplink message comprises: selecting the symbol length from the set of symbol lengths based at least in part on the scheduling information.

Aspect 15: The method of any of aspects 1 through 14, further comprising: determining a reference signal mapping type for the uplink message based at least in part on a portion of the scheduling information of the control message.

Aspect 16: The method of aspect 15, further comprising: determining that the reference signal mapping type is Type-A mapping based at least in part on a starting symbol and a symbol length of the uplink message.

Aspect 17: The method of any of aspects 1 through 16, further comprising: determining a repetition index based at least in part on the scheduling information; and determining a number of repetitions for the uplink message based at least in part on the repetition index.

Aspect 18: The method of aspect 17, further comprising: determining a number of repetitions for the downlink message based at least in part on the scheduling information; and determining the number of repetitions for the uplink message based at least in part on the number of repetitions of the downlink message.

Aspect 19: The method of aspect 18, further comprising: determining the number of repetitions for the uplink message based at least in part on the number of repetitions for the downlink message and a delta value.

Aspect 20: The method of any of aspects 17 through 19, further comprising: receiving a message from the base station comprising the repetition index, wherein the message is received via RRC signaling.

Aspect 21: The method of any of aspects 1 through 20, further comprising: communicating the uplink and downlink messages with the base station via a same carrier based at least in part on the scheduling information.

Aspect 22: The method of aspect 21, further comprising: receiving the control message via a carrier different from the same carrier used for the uplink and downlink messages.

Aspect 23: The method of any of aspects 1 through 22, further comprising: determining a first MCS for the downlink message based at least in part on the control message; and determining a second MCS for the uplink message based at least in part on the first MCS for the downlink message.

Aspect 24: The method of any of aspects 1 through 23, wherein the first resources at least partially overlap the second resources in at least one of time or frequency.

Aspect 25: An apparatus for wireless communications at a UE, comprising a processor; memory coupled with the processor; and instructions stored in the memory and executable by the processor to cause the apparatus to perform a method of any of aspects 1 through 24.

Aspect 26: An apparatus for wireless communications at a UE, comprising at least one means for performing a method of any of aspects 1 through 24.

Aspect 27: A non-transitory computer-readable medium storing code for wireless communications at a UE, the code comprising instructions executable by a processor to perform a method of any of aspects 1 through 24.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for wireless communications at a user equipment (UE), comprising:
   a memory; and
   at least one processor coupled to the memory, wherein the at least one processor is configured to:
      receive a joint control message that comprises scheduling information for a downlink message for the UE and for an uplink shared channel message for transmission by the UE, wherein the scheduling information allocates a first set of resources within a slot for the downlink message and a second set of resources within the slot for the uplink shared channel message such that the first set of resources and the second set of resources at least partially overlap in time or frequency, in accordance with a sub-band full duplex capability of the UE;
      receive the downlink message via the first set of resources according to first timing information, wherein the first timing information is based at least in part on the scheduling information; and
      transmit the uplink shared channel message via the second set of resources according to second timing information, wherein the second timing information is based at least in part on the first timing information and on the scheduling information.

2. The apparatus of claim 1, wherein the at least one processor is configured to:
   determine, for the downlink message, one or more of a starting symbol, a length value, a slot offset, or a mapping type, based at least in part on a time domain resource allocation field of the joint control message.

3. The apparatus of claim 1, wherein the at least one processor is configured to:
   receive, from a network device, a message that indicates a delta symbol value associated with the second timing information for the uplink shared channel message, wherein the message is received via radio resource control (RRC) signaling, a medium access control (MAC) control element (MAC-CE), or downlink control information (DCI).

4. The apparatus of claim 3, wherein the at least one processor is configured to:
   determine a starting symbol for the uplink shared channel message based on a starting symbol of the downlink message and the delta symbol value.

5. The apparatus of claim 3, wherein the at least one processor is configured to:
   determine a starting symbol for the uplink shared channel message based at least in part on the delta symbol value and a symbol during a monitoring occasion in which the joint control message is received.

6. The apparatus of claim 3, wherein the message comprises a set of delta symbol values, and wherein the at least one processor is configured to:
   select the delta symbol value from the set of delta symbol values based at least in part on the scheduling information.

7. The apparatus of claim 1, wherein the at least one processor is configured to:
   receive, from a network device, a message that indicates a delta slot value associated with the second timing information for the uplink shared channel message, wherein the message is received via radio resource control (RRC) signaling, a medium access control (MAC) control element (MAC-CE), or downlink control information (DCI).

8. The apparatus of claim 7, wherein the at least one processor is configured to:
  determine a slot for transmission of the uplink shared channel message based at least in part on a starting symbol for the downlink message, the delta slot value, and a ratio, wherein the ratio is based at least in part on a first subcarrier spacing for the uplink shared channel message and a second subcarrier spacing for the downlink message.

9. The apparatus of claim 7, wherein the at least one processor is configured to:
  determine a slot for transmission of the uplink shared channel message based at least in part on a slot scheduled for the downlink message and the delta slot value.

10. The apparatus of claim 1, wherein the at least one processor is configured to:
  determine a set of time resources for transmission of the uplink shared channel message based at least in part on the first timing information for the downlink message;
  apply a timing advance of the UE for transmitting the uplink shared channel message based at least in part on the set of time resources; and
  transmit the uplink shared channel message in accordance with the set of time resources and the applied timing advance.

11. The apparatus of claim 1, wherein the at least one processor is configured to:
  determine a set of time resources for transmission of the uplink shared channel message that are aligned with a set of downlink symbols based at least in part on the first timing information for the downlink message or the second timing information for the uplink shared channel message; and
  transmit the uplink shared channel message via the set of time resources.

12. The apparatus of claim 1, wherein the at least one processor is configured to:
  determine a symbol length for transmission of the uplink shared channel message based at least in part on a start symbol of the uplink shared channel message.

13. The apparatus of claim 1, wherein the at least one processor is configured to:
  receive, from a network device, a message that comprises a length indicator for transmission of the uplink shared channel message, wherein the message is received via radio resource control (RRC) signaling, a medium access control (MAC) control element (MAC-CE), or downlink control information (DCI);
  determine a symbol length for the uplink shared channel message based at least in part on the length indicator; and
  transmit the uplink shared channel message in accordance with the determined symbol length.

14. The apparatus of claim 13, wherein the length indicator comprises a set of symbol lengths, and wherein, to determine the symbol length for the uplink shared channel message, the at least one processor is configured to:
  select the symbol length from the set of symbol lengths based at least in part on the scheduling information.

15. The apparatus of claim 1, wherein the at least one processor is configured to:
  determine a reference signal mapping type for the uplink shared channel message based at least in part on a portion of the scheduling information of the joint control message.

16. The apparatus of claim 15, wherein the at least one processor is configured to:
  determine that the reference signal mapping type is Type-A mapping based at least in part on a starting symbol and a symbol length of the uplink shared channel message.

17. The apparatus of claim 1, wherein the at least one processor is configured to:
  determine a repetition index based at least in part on the scheduling information; and
  determine a number of repetitions for the uplink shared channel message based at least in part on the repetition index.

18. The apparatus of claim 17, wherein the at least one processor is configured to:
  determine a number of repetitions for the downlink message based at least in part on the scheduling information; and
  determine the number of repetitions for the uplink shared channel message based at least in part on the number of repetitions of the downlink message.

19. The apparatus of claim 18, wherein the at least one processor is configured to:
  determine the number of repetitions for the uplink shared channel message based at least in part on the number of repetitions for the downlink message and a delta value.

20. The apparatus of claim 17, wherein the at least one processor is configured to:
  receive, from a network device, a message that comprises the repetition index, wherein the message is received via radio resource control (RRC) signaling.

21. The apparatus of claim 1, wherein the at least one processor is configured to:
  communicate the uplink shared channel messages and the downlink message with a network device via a same carrier based at least in part on the scheduling information.

22. The apparatus of claim 21, wherein the at least one processor is configured to:
  receive the joint control message via a carrier different from the same carrier used for the uplink shared channel messages and the downlink message.

23. The apparatus of claim 1, wherein the at least one processor is configured to:
  determine a first modulation and coding scheme (MCS) for the downlink message based at least in part on the joint control message; and
  determine a second MCS for the uplink shared channel message based at least in part on the first MCS for the downlink message.

24. A method of wireless communications performed by a user equipment (UE), comprising:
  receiving a joint control message that comprises scheduling information for a downlink message for the UE and for an uplink shared channel message for transmission by the UE, the scheduling information allocating a first set of resources within a slot for the downlink message and a second set of resources within the slot for the uplink shared channel message such that the first set of resources and the second set of resources at least partially overlap in time or frequency, in accordance with a sub-band full duplex capability of the UE;

receiving the downlink message using the first set of resources according to a first timing information, wherein the first timing information is based at least in part on the scheduling information; and transmitting the uplink shared channel message using the second set of resources according to a second timing information, wherein the second timing information is based at least in part on the first timing information and on the scheduling information.

25. The method of claim 24, further comprising:
determining, for the downlink message, one or more of a starting symbol, a length value, a slot offset, or a mapping type, based at least in part on a time domain resource allocation field of the joint control message.

26. The method of claim 24, further comprising:
receiving, from a network device, a message indicating a delta symbol value associated with the second timing information for the uplink shared channel message, wherein the message is received via radio resource control (RRC) signaling, a medium access control (MAC) control element (MAC-CE), or downlink control information (DCI).

27. The method of claim 26, further comprising:
determining a starting symbol for the uplink shared channel message based at least in part on a starting symbol of the downlink message and the delta symbol value.

28. The method of claim 26, further comprising:
determining a starting symbol for the uplink shared channel message based at least in part on the delta symbol value and a symbol during a monitoring occasion in which the joint control message is received.

29. The method of claim 26, wherein the message comprises a set of delta symbol values, and the method further comprises:
selecting the delta symbol value from the set of delta symbol values based at least in part on the scheduling information.

30. The method of claim 24, further comprising:
receiving, from a network device, a message indicating a delta slot value associated with the second timing information for the uplink shared channel message, wherein the message is received via radio resource control (RRC) signaling, a medium access control (MAC) control element (MAC-CE), or downlink control information (DCI).

31. The method of claim 30, further comprising:
determining a slot for transmission of the uplink shared channel message based at least in part on a starting symbol for the downlink message, the delta slot value, and a ratio, wherein the ratio is based at least in part on a first subcarrier spacing for the uplink shared channel message and a second subcarrier spacing for the downlink message.

32. The method of claim 30, further comprising:
determining a slot for transmission of the uplink shared channel message based at least in part on a slot scheduled for the downlink message and the delta slot value.

33. The method of claim 24, further comprising:
determining a set of time resources for transmission of the uplink shared channel message based at least in part on the first timing information for the downlink message;
applying a timing advance of the UE for transmitting the uplink shared channel message based at least in part on the set of time resources; and
transmitting the uplink shared channel message in accordance with the set of time resources and the applied timing advance.

34. The method of claim 24, further comprising:
determining a set of time resources for transmission of the uplink shared channel message that are aligned with a set of downlink symbols based at least in part on the first timing information for the downlink message or the second timing information for the uplink shared channel message; and
transmitting the uplink shared channel message via the set of time resources.

35. The method of claim 24, further comprising:
determining a symbol length for transmission of the uplink shared channel message based at least in part on a start symbol of the uplink shared channel message.

36. The method of claim 24, further comprising:
receiving a message from a network device comprising a length indicator for transmission of the uplink shared channel message, wherein the message is received via radio resource control (RRC) signaling, a medium access control (MAC) control element (MAC-CE), or downlink control information (DCI);
determining a symbol length for the uplink shared channel message based at least in part on the length indicator; and
transmitting the uplink shared channel message in accordance with the determined symbol length.

37. The method of claim 36, wherein the length indicator comprises a set of symbol lengths, and wherein determining for the uplink shared channel message comprises:
selecting the symbol length from a set of symbol lengths based at least in part on the scheduling information.

38. The method of claim 24, further comprising:
determining a reference signal mapping type for the uplink shared channel message based at least in part on a portion of the scheduling information of the joint control message.

39. The method of claim 38, further comprising:
determining that the reference signal mapping type is Type-A mapping based at least in part on a starting symbol and a symbol length of the uplink shared channel message.

40. The method of claim 24, further comprising:
determining a repetition index based at least in part on the scheduling information; and
determining a number of repetitions for the uplink shared channel message based at least in part on the repetition index.

41. The method of claim 40, further comprising:
determining a number of repetitions for the downlink message based at least in part on the scheduling information; and
determining the number of repetitions for the uplink shared channel message based at least in part on the number of repetitions of the downlink message.

42. The method of claim 41, further comprising:
determining the number of repetitions for the uplink shared channel message based at least in part on the number of repetitions for the downlink message and a delta value.

43. The method of claim 40, further comprising:
receiving, from a network device, a message comprising the repetition index, wherein the message is received via radio resource control (RRC) signaling.

44. The method of claim 24, further comprising:
communicating the uplink shared channel message and the downlink message with a network device via a same carrier based at least in part on the scheduling information.

45. The method of claim 44 further comprising:
receiving the joint control message via a carrier different from the same carrier used for the uplink shared channel message and the downlink message.

46. The method of claim 24, further comprising:
determining a first modulation and coding scheme (MCS) for the downlink message based at least in part on the joint control message; and
determining a second MCS for the uplink shared channel message based at least in part on the first MCS for the downlink message.

\* \* \* \* \*